(12) United States Patent
Papasakellariou

(10) Patent No.: US 11,711,192 B2
(45) Date of Patent: Jul. 25, 2023

(54) TRANSMISSION OF CONTROL INFORMATION FOR COMMUNICATION WITH MULTIPLE TRANSMISSION-RECEPTION POINTS

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 16/946,606

(22) Filed: Jun. 29, 2020

(65) Prior Publication Data

US 2021/0014026 A1    Jan. 14, 2021

Related U.S. Application Data

(60) Provisional application No. 62/900,770, filed on Sep. 16, 2019, provisional application No. 62/895,132, (Continued)

(51) Int. Cl.
  *H04L 5/00* (2006.01)
  *H04L 1/1812* (2023.01)

(52) U.S. Cl.
  CPC .......... *H04L 5/0055* (2013.01); *H04L 1/1812* (2013.01)

(58) Field of Classification Search
  CPC combination set(s) only.
  See application file for complete search history.

(56) References Cited

U.S. PATENT DOCUMENTS 11,095,415 B2 * 8/2021 Papasakellariou ...... H04L 5/001
2019/0149275 A1 * 5/2019 He ........................ H04L 5/0064
                                                        370/329

(Continued)

FOREIGN PATENT DOCUMENTS

WO    2018/143785 A1    8/2018

OTHER PUBLICATIONS

"5G; NR; Physical channelsand modulation (3GPP TS 38.211 version 15.6.0 Release 15)", ETSI TS 138 211 V15.6.0, Jul. 2019, 100 pages.

(Continued)

*Primary Examiner* — Hanh N Nguyen

(57) ABSTRACT

Methods and apparatuses for transmitting and receiving HARQ-ACK information. A method of operating a UE includes receiving: a configuration for a first group index for first control resource sets (CORESETs), physical downlink control channels (PDCCHs) in CORESETs, wherein the PDCCHs provide respective downlink control information (DCI) formats scheduling respective receptions of physical downlink shared channels (PDSCHs), and the PDSCHs corresponding to the PDCCHs. The method further includes determining HARQ-ACK information bits in response to a PDSCH reception. When a PDCCH reception is in a CORESET from the first CORESETs, the HARQ-ACK information bits are in a first HARQ-ACK codebook. When the PDCCH reception is not in a CORESET from the first CORESETs, the HARQ-ACK information bits are in a second HARQ-ACK codebook. The method further includes transmitting a first physical uplink control channel (PUCCH) with the first HARQ-ACK codebook and a second PUCCH with the second HARQ-ACK codebook.

20 Claims, 15 Drawing Sheets

Related U.S. Application Data filed on Sep. 3, 2019, provisional application No. 62/873,010, filed on Jul. 11, 2019.

(56) References Cited

U.S. PATENT DOCUMENTS

| | | | | |
|---|---|---|---|---|
| 2019/0158205 | A1* | 5/2019 | Sheng | H04B 7/0626 |
| 2020/0305088 | A1* | 9/2020 | Nory | H04W 52/242 |
| 2021/0022124 | A1* | 1/2021 | Miao | H04W 72/04 |
| 2021/0391955 | A1* | 12/2021 | He | H04L 1/1861 |

OTHER PUBLICATIONS

"5G; NR; Multiplexing and channel coding (3GPP TS 38.212 version 15.6.0 Release 15)", ETSI TS 138 212 V15.6.0, Jul. 2019, 106 pages.

"5G; NR; Physical layer procedures for control (3GPP TS 38.213 version 15.6.0 Release 15)", ETSI TS 138 213 V15.6.0, Jul. 2019, 110 pages.

"5G; NR; Physical layer procedures for data (3GPP TS 38.214 version 15.6.0 Release 15)", ETSI TS 138 214 V15.6.0, Jul. 2019, 108 pages.

"5G; NR; Medium Access Control (MAC) protocol specification (3GPP TS 38.321 version 15.6.0 Release 15)", ETSI TS 138 321 V15.6.0, Jul. 2019, 80 pages.

"5G; NR; Radio Resource Control (RRC); Protocol specification (3GPP TS 38.331 version 15.6.0 Release 15)", ETSI TS 138 331 V15.6.0, Jul. 2019, 516 pages.

CATT, "Consideration on multi-TRP/panel transmission", 3GPP TSG RAN WG1 Ad-Hoc Meeting 1901, Jan. 21-25, 2019, R1-1900339, 14 pages.

NTT Docomo, Inc., "Enhancements on multi-TRP/panel transmission", 3GPP TSG RAN WG1 #97, May 13-17, 2019, R1-1906224, 32 pages.

Panasonic, "On multi-TRP enhancements for NR MIMO in Rel. 16", 3GPP TSG RAN WG1 #97, May 13-17, 2019, R1-1907031, 16 pages.

Nokia, Nokia Shanghai Bell, "Enhancements on Multi-TRP/Panel Transmission", 3GPP TSG RAN WG1 #97 Meeting, May 13-17, 2019, R1-1907316, 21 pages.

Notification of Transmittal of the International Search Report and the Written Opinion of the International Searching Authority, or the Declaration dated Oct. 13, 2020 in connection with International Patent Application No. PCT/KR2020/009201, 10pages.

Extended European Search Report dated May 27, 2022 regarding Application No. 20837404.1, 11 pages.

Qualcomm Incorporated, "Multi-TRP Enhancements", 3GPP TSG-RAN WG1 Meeting #97, R1-1907289, May 2019, 25 pages.

Huawei et al.. "Summary of AI: 7.2 8.2 Enhancements on Multi-TRP/Panel Transmission of Offline Discussion", 3GPP TSG RAN WG1 Meeting #96bis, R1-190abcd, Apr. 2019, 59 pages.

* cited by examiner

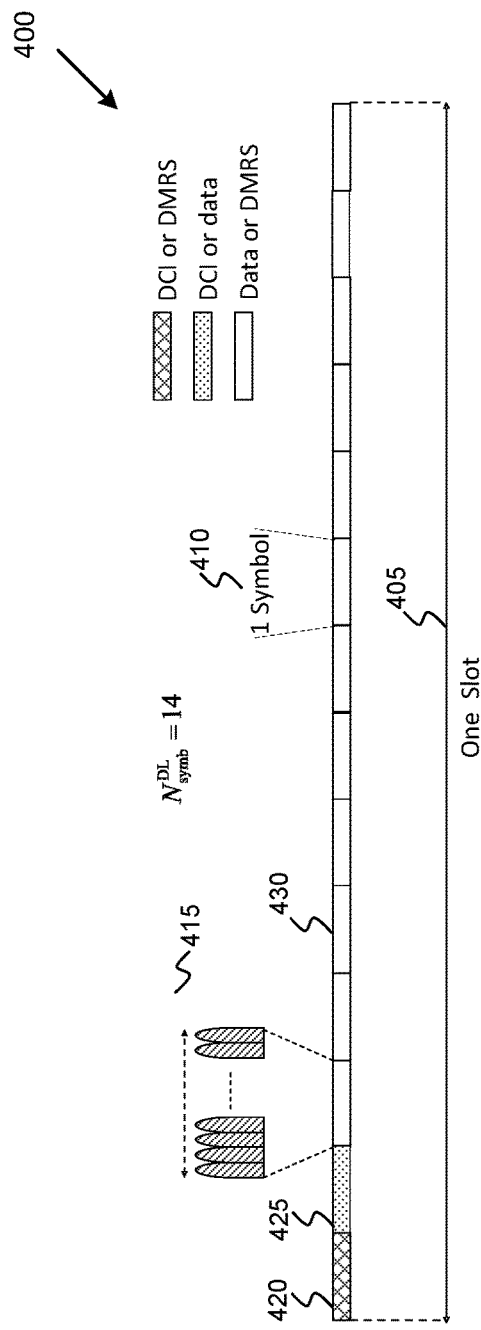

TRANSMISSION OF CONTROL INFORMATION FOR COMMUNICATION WITH MULTIPLE TRANSMISSION-RECEPTION POINTS

CROSS-REFERENCE TO RELATED APPLICATIONS AND CLAIM OF PRIORITY

This application claims priority to U.S. Provisional Patent Application No. 62/873,010 filed Jul. 11, 2019, U.S. Provisional Patent Application No. 62/895,132 filed Sep. 3, 2019, and U.S. Provisional Patent Application No. 62/900,770 filed Sep. 16, 2019, the disclosures of which are incorporated herein by reference in their entireties.

TECHNICAL FIELD

The present disclosure relates to wireless communication systems. More particularly, the present disclosure relates to transmissions of control information for communication with multiple transmission-reception points (TRPs).

BACKGROUND

There is a demand for an improved 5G communication system. The 5G communication system can be implemented in higher frequency (mmWave) bands, for example 28 GHz bands, to enable higher data rates. A user equipment (UE) can communicate with multiple transmission/reception points (TRPs), referred to as multi-TRP communication. Multi-TRP communication can enhance reliability or data rates for communications and provide time, frequency, or spatial diversity or multiplexing for transmission and reception of data or control information. However, multi-TRP communications present various challenges related to spatial settings of the TRPs and to transmissions of physical uplink control channels (PUCCHs) to different TRPs.

SUMMARY

The present disclosure relates to monitoring downlink control channels for communication with multiple transmission reception points.

In one embodiment, a UE is provided. The UE includes a transceiver configured to receive: a configuration for a first group index for first control resource sets (CORESETs), physical downlink control channels (PDCCHs) in CORESETs, wherein the PDCCHs provide respective downlink control information (DCI) formats scheduling respective receptions of physical downlink shared channels (PDSCHs), and the PDSCHs corresponding to the PDCCHs. The UE includes a processor operably connected to the transceiver. The processor is configured to determine hybrid automatic repeat request acknowledgement (HARQ-ACK) information bits in response to a PDSCH reception. When a PDCCH reception is in a CORESET from the first CORESETs, the HARQ-ACK information bits are in a first HARQ-ACK codebook. When the PDCCH reception is not in a CORESET from the first CORESETs, the HARQ-ACK information bits are in a second HARQ-ACK codebook. The transceiver is further configured to transmit a first physical uplink control channel (PUCCH) with the first HARQ-ACK codebook and a second PUCCH with the second HARQ-ACK codebook.

In another embodiment, a base station is provided. The base station includes a transceiver configured to transmit a configuration for a first group index for first CORESETs and transmit physical PDCCHs in CORESETs, wherein the PDCCHs provide respective DCI formats scheduling respective receptions of PDSCHs. The transceiver is further configured to transmit the PDSCHs corresponding to the PDCCHs; and receive a first PUCCH with a first HARQ-ACK codebook and a second PUCCH with a second HARQ-ACK codebook. The first and second HARQ-ACK codebooks provide HARQ-ACK information bits for the PDSCH transmissions. When a PDCCH transmission is in a CORESET from the first CORESETs, HARQ-ACK information bits for a corresponding PDSCH transmission are in the first HARQ-ACK codebook. When the PDCCH transmission is not in a CORESET from the first CORESETs, HARQ-ACK information bits for the corresponding PDSCH transmission are in the second HARQ-ACK codebook.

In yet another embodiment, a method for transmitting HARQ-ACK information is provided. The method includes receiving: a configuration for a first group index for first CORESETs, PDCCHs in CORESETs, wherein the PDCCHs provide respective downlink control information (DCI) formats scheduling respective receptions of PDSCHs, and the PDSCHs corresponding to the PDCCHs. The method further includes determining HARQ-ACK information bits in response to a PDSCH reception. When a PDCCH reception is in a CORESET from the first CORESETs, the HARQ-ACK information bits are in a first HARQ-ACK codebook. When the PDCCH reception is not in a CORESET from the first CORESETs, the HARQ-ACK information bits are in a second HARQ-ACK codebook. The method further includes transmitting a first PUCCH with the first HARQ-ACK codebook and a second PUCCH with the second HARQ-ACK codebook.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4A illustrates an example downlink (DL) slot structure according to various embodiments of the present disclosure;

FIG. 4B illustrates an example uplink (UL) slot structure for PUSCH transmission or PUCCH transmission according to various embodiments of the present disclosure;

DETAILED DESCRIPTION

Figure 1:
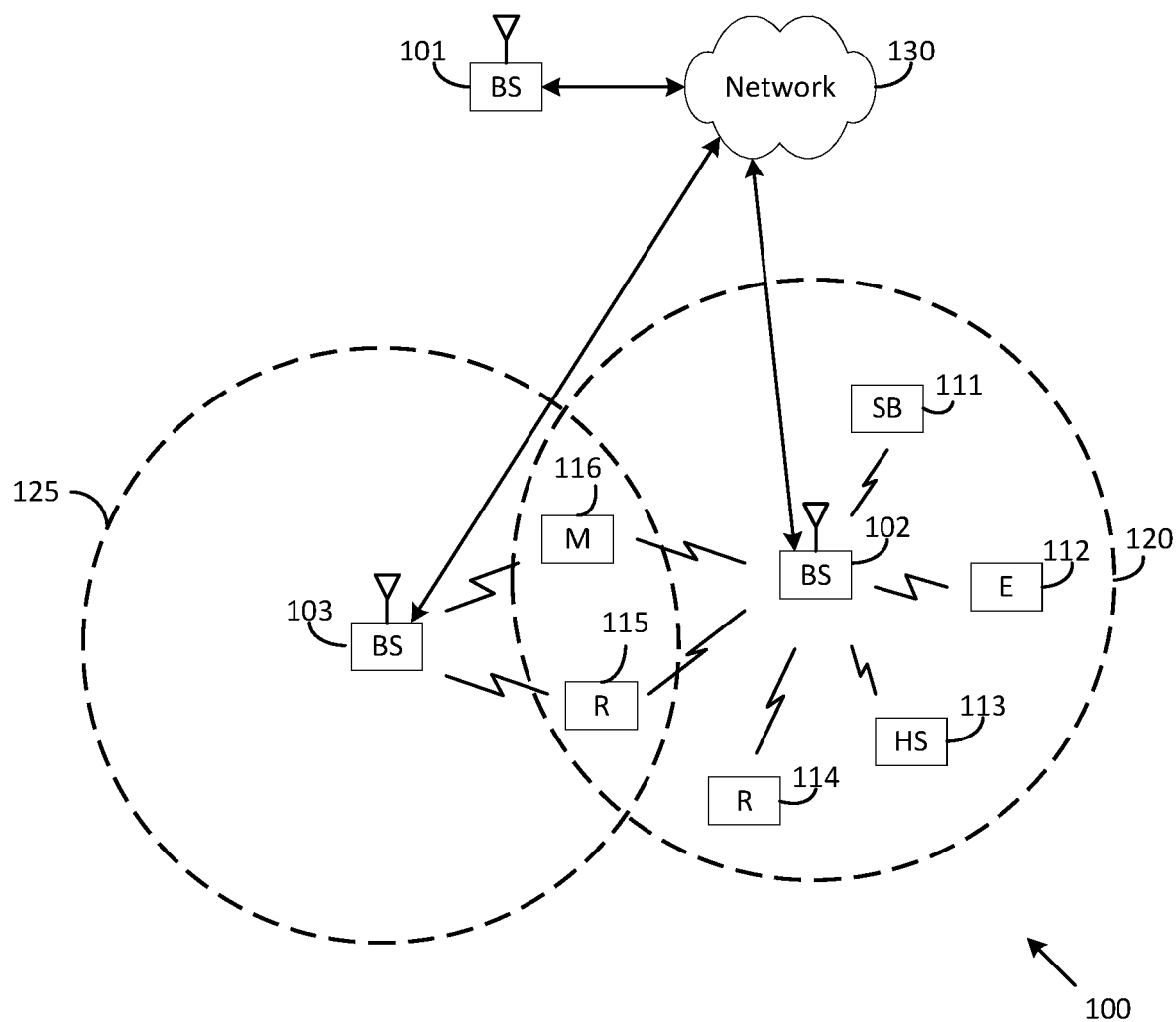
FIG. 1 illustrates an example wireless network according to various embodiments of the present disclosure.

FIGS. 1 through 14, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

Depending on the network type, the term 'base station' can refer to any component (or collection of components) configured to provide wireless access to a network, such as transmit point (TP), transmit-receive point (TRP), a gNB, a macrocell, a femtocell, a WiFi access point (AP), or other wirelessly enabled devices. Base stations can provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. The terms 'gNB' and 'TRP' can be used interchangeably in this disclosure to refer to network infrastructure components that provide wireless access to remote terminals. Also, depending on the network type, the term UE can refer to any component such as mobile station, subscriber station, remote terminal, wireless terminal, receive point, or user device. A UE can be a mobile device or a stationary device.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are considered in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

The discussion of 5G systems and frequency bands associated therewith is for reference as certain embodiments of the present disclosure can be implemented in 5G systems. However, the present disclosure is not limited to 5G systems or the frequency bands associated therewith, and embodiments of the present disclosure can be utilized in connection with any frequency band.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in the present disclosure to refer to network infrastructure components that provide wireless access to remote terminals. Depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in the present disclosure to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which can be located in a small business; a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as other types of data networks.

Figure 2A:
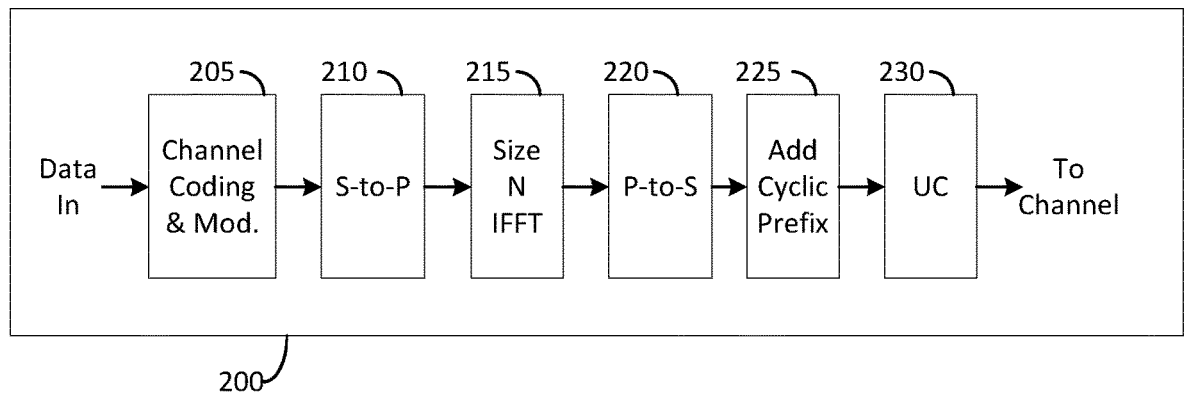
FIGS. 2A and 2B illustrate example wireless transmit and receive paths according to various embodiments of the present disclosure, respectively.
Figure 2B:
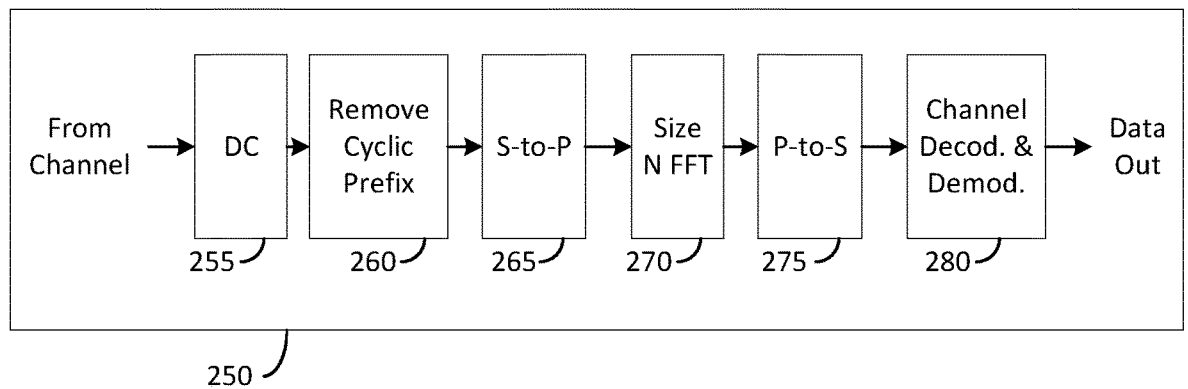

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 can be implemented in a gNB (such as gNB 102) and that the transmit path 200 can be implemented in a UE (such as UE 116).

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, polar, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

The transmit path 200 or the receive path 250 can perform signaling for reporting of uplink control information such as HARQ-ACK information or CSI. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the size N FFT block 270 and the size N IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B can be combined, further subdivided, or omitted and additional components can be added according to particular needs. FIGS. 2A and 2B are meant to illustrate examples of the types of transmit and receive paths that can be used in a wireless network. Other suitable architectures can be used to support wireless communications in a wireless network.

Figure 3A:
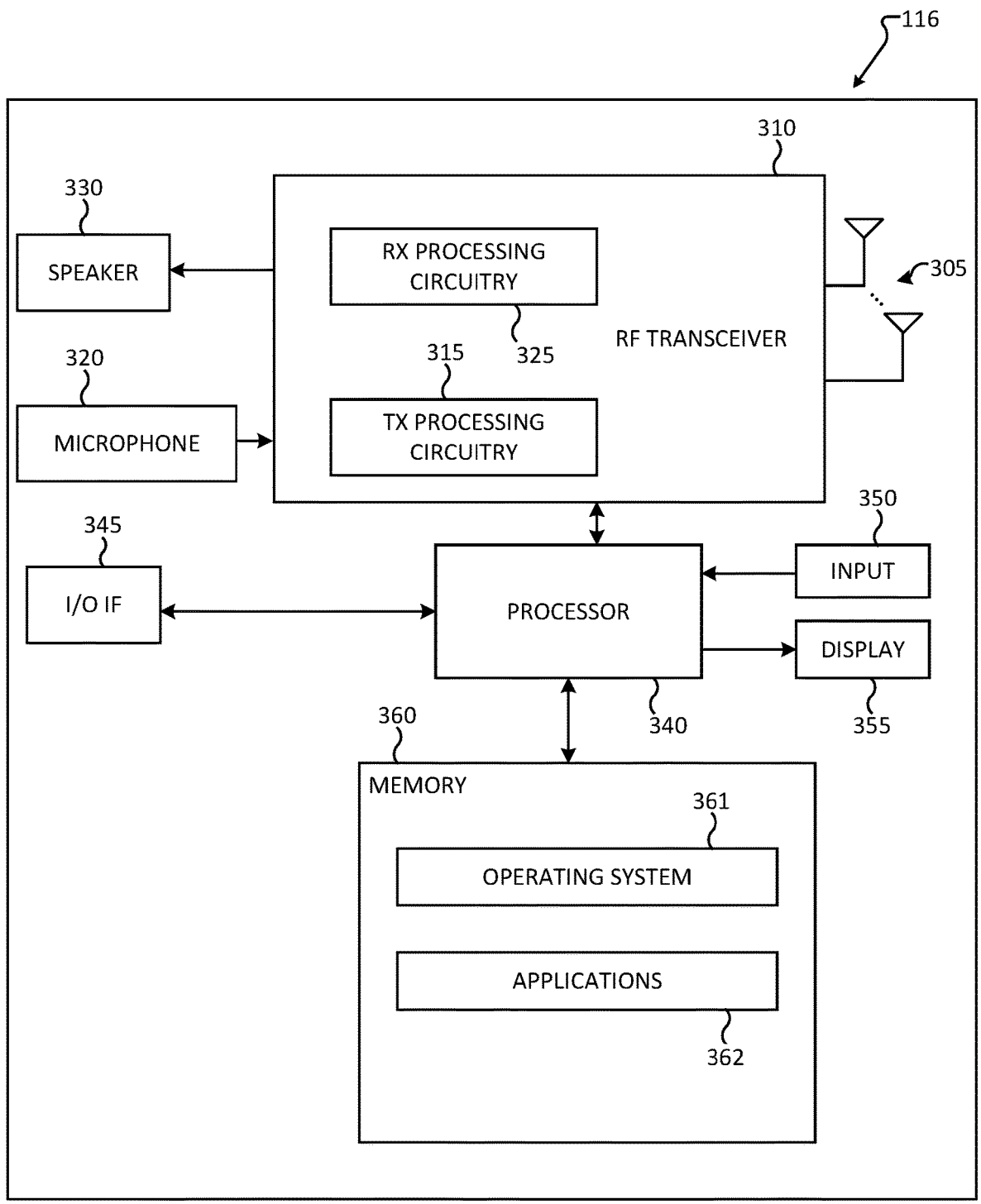
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 can have the same or similar configuration. However, UEs come in a wide variety of configurations, and FIG. 3A does not limit the scope of the present disclosure to any particular implementation of a UE.

The UE 116 includes one or more transceivers 310, a microphone 320, a speaker 330, a processor 340, an input/output (I/O) interface 345, an input 350, a display 355, and a memory 360. The memory 360 includes an operating system (OS) program 361 and one or more applications 362.

The transceiver 310 includes transmit (TX) processing circuitry 315 to modulate signals, receive (RX) processing circuitry 325 to demodulate signals, and an antenna array 305 including antennas to send and receive signals. The antenna array 305 receives an incoming signal transmitted by a gNB of the wireless network 100 of FIG. 1. The transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can execute other processes and programs resident in the memory 360, such as operations for non-zero power or zero power channel state information reference signal (CSI-RS) reception and measurement for systems. The processor 340 can move data into or out of the memory 360 as part of an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. The memory 360 can include at least one of a random-access memory (RAM), Flash memory, or other read-only memory (ROM).

Although FIG. 3A illustrates one example of UE 116, various changes can be made to FIG. 3A. For example, various components in FIG. 3A can be combined, further subdivided, or omitted and additional components can be added according to particular needs. As a particular example, the processor 340 can be divided into multiple processors, such as one or more central processing units (CPUs) and one or more graphics processing units (GPUs). Although FIG. 3A illustrates the UE 116 as a mobile telephone or smartphone, UEs can be configured to operate as other types of mobile or stationary devices.

Figure 3B:
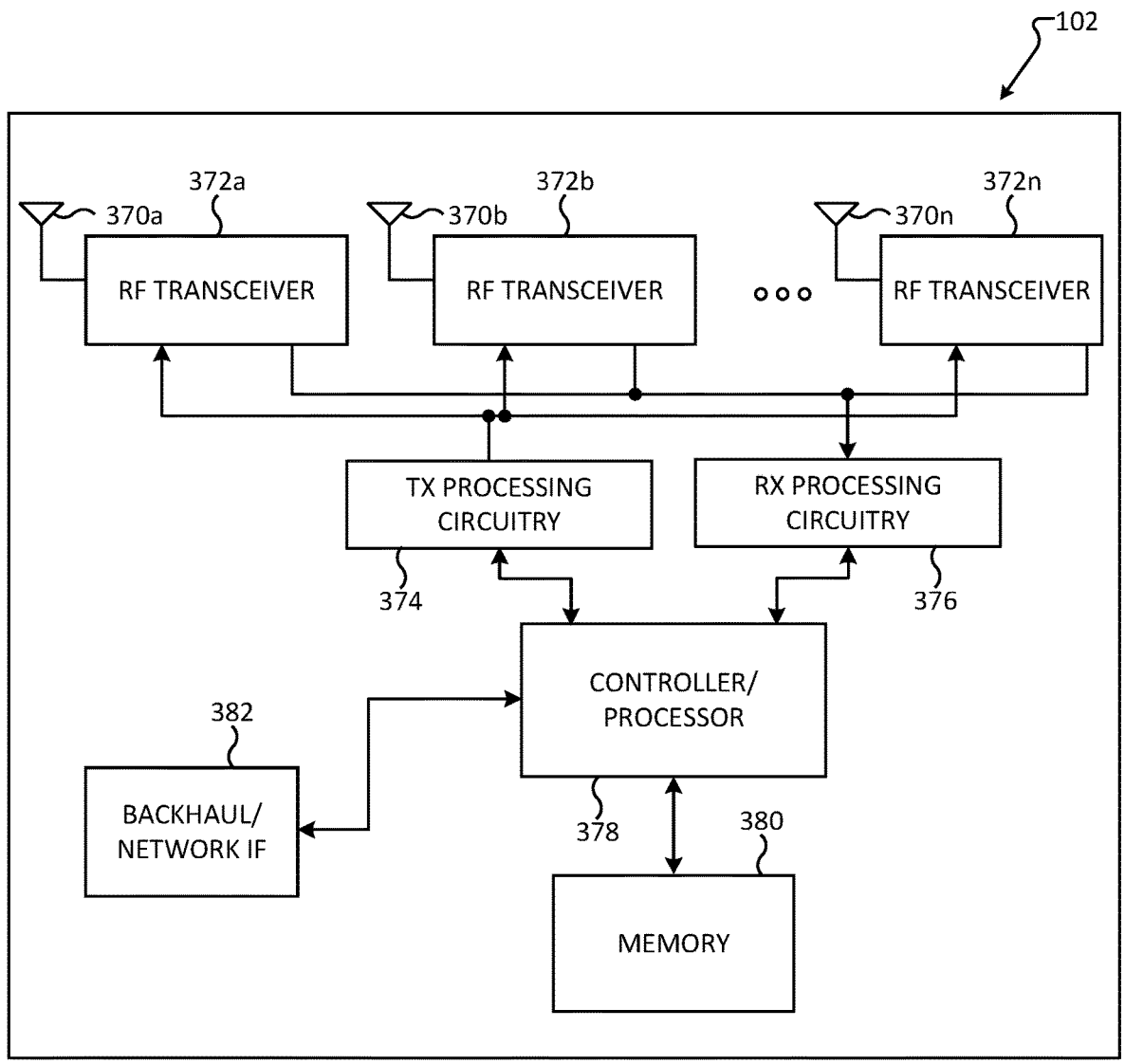
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions can be supported in the gNB 102 by the controller/processor 378. In some embodiments, the controller/processor 378 includes at least one microprocessor or microcontroller.

The controller/processor 378 can execute programs and other processes resident in the memory 380, such as an OS. The controller/processor 378 can support channel quality measurement and reporting for systems having 2D antenna arrays. In some embodiments, the controller/processor 378 supports communications between entities, such as web RTC. The controller/processor 378 can move data into or out of the memory 380 as part of an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of a RAM, a Flash memory, or other ROM. In certain embodiments, a plurality of instructions is stored in memory.

Although FIG. 3B illustrates one example of a gNB 102, various changes can be made to FIG. 3B. For example, the gNB 102 can include any number of each component shown in FIG. 3A. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

A time unit for DL signaling or for UL signaling on a cell is one symbol. A symbol belongs to a slot that includes a number of symbols such as 14 symbols and is referred to as DL symbol if used for DL signaling, UL symbol if used for UL signaling, or flexible symbol if it can be used for either DL signaling or UL signaling. The slot can also be a time unit for DL or UL signaling on a cell.

A bandwidth (BW) unit is referred to as a resource block (RB). One RB includes a number of sub-carriers (SCs), such as 12 subcarriers. An RB in one symbol of a slot is referred to as physical RB (PRB) and includes a number of resource elements (REs). For example, a slot can have a duration of 1 millisecond and an RB can have a BW of 180 kHz and include 12 SCs with SC spacing of 15 kHz. As another example, a slot can have a duration of 0.25 milliseconds and a RB can have a BW of 720 kHz and include 12 SCs with SC spacing of 60 kHz.

DL signals include signals providing synchronization and system information, data signals providing user-specific information content, control signals conveying DL control information (DCI), and reference signals (RS) that are also known as pilot signals. A gNB, for example the gNB 102, can transmit synchronization signal/primary broadcast channel (SS/PBCH) blocks to enable a UE, such as UE 116, to establish synchronization on a serving cell and obtain system information. The gNB 102 can also transmit data information or DCI through respective physical DL shared channels (PDSCHs) or physical DL control channels (PDCCHs). The gNB can transmit one or more of multiple types of RS including channel state information RS (CSI-RS) and demodulation RS (DMRS). A CSI-RS is primarily intended for UEs to perform various measurements and to provide channel state information (CSI) to a gNB. For channel measurement, non-zero power CSI-RS (NZP CSI-RS) resources can be used. For interference measurement reports (IMRs), CSI interference measurement (CSI-IM) resources associated with a zero power CSI-RS (ZP CSI-RS) configuration can be used.

A CSI process can include NZP CSI-RS and CSI-IM resources. A UE, for example the UE 116, can determine CSI-RS transmission parameters through DL control signaling provided by a DCI format or by higher layers, such as radio resource control (RRC) signaling, from a gNB. Transmission instances of a CSI-RS can be indicated by DL control signaling at the physical layer or configured by higher layer signaling. A DMRS is typically received by the UE only in the BW of a respective PDCCH or PDSCH reception and the UE can use the DMRS to demodulate data or control information.

For example, FIG. 4A illustrates a downlink (DL) slot structure according to various embodiments of the present disclosure. The embodiment of the DL slot structure 400 shown in FIG. 4A is for illustration only and should not be construed as limiting. FIG. 4A does not limit the scope of the present disclosure to any particular DL slot structure.

A DL slot 405 includes $N_{symb}^{DL}$ symbols 410 where a gNB can transmit data information, DCI, or DMRS. A DL system BW includes $N_{RB}^{DL}$ RBs. Each RB includes $N_{sc}^{RB}$ SCs. A UE, such as the UE 116, is assigned $M_{PDSCH}$ RBs for a total of $N_{sc}^{PDSCH}=M_{PDSCH} \cdot N_{sc}^{RB}$ SCs 415 for a PDSCH transmission BW. A PDCCH conveying DCI is transmitted over control channel elements (CCEs) that are substantially spread across the DL system BW. A first slot symbol 420 can be used by the gNB 102 to transmit PDCCH (and associated DMRS). A second slot symbol 425 can be used by the gNB 102 to transmit PDCCH or PDSCH. Remaining slot symbols 430 can be used by the gNB 102 to transmit PDSCH (and associated DMRS) and CSI-RS. In some slots, the gNB 102 can also transmit synchronization signals and channels that convey system information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE can transmit data information or UCI through a respective physical UL shared channel (PUSCH) or a physical UL control channel (PUCCH). When a UE simultaneously transmits data information and UCI, the UE can multiplex both in a PUSCH or transmit both a PUCCH with UCI and a PUSCH with data information and possibly some UCI. UCI includes hybrid automatic repeat request acknowledgement (HARQ-ACK) information, indicating correct or incorrect decoding of transport blocks (TBs) or code blocks in a PDSCH, scheduling request (SR) indicating whether a UE has data in its buffer, and CSI reports enabling a gNB to select appropriate parameters for PDSCH or PDCCH transmissions to a UE. For systems operating with hybrid beamforming, UCI can also include beam information such as an index for a set of quasi-collocation parameters, from multiple sets of quasi-collocation parameters, for a received signal and a corresponding reference signal received power (RSRP) value.

A CSI report from a UE can include a channel quality indicator (CQI) informing a gNB of a largest modulation and coding scheme (MCS) for the UE to detect a data TB with a predetermined block error rate (BLER), such as a 10% BLER, a precoding matrix indicator (PMI) informing a gNB how to combine signals from multiple transmitter antennas in accordance with a multiple input multiple output (MIMO) transmission principle, and a rank indicator (RI) indicating a transmission rank for a PDSCH.

UL RS includes DMRS and SRS. In some embodiments, DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS reception by the gNB can also provide a PMI for DL transmissions by the gNB. Additionally, in order to establish synchronization or an initial RRC connection with a gNB, a UE can transmit a physical random-access channel (PRACH).

FIG. 4B illustrates an example slot structure for PUSCH transmission or PUCCH transmission according to various embodiments of the present disclosure. The embodiment of the slot structure 450 shown in FIG. 4B is for illustration only and should not be construed as limiting. FIG. 4B does not limit the scope of the present disclosure to any particular slot structure.

A slot 455 can include $N_{symb}^{UL}$ symbols 460 where a UE, such as the UE 116, transmits a PUSCH or a PUCCH with data information, UCI, or DMRS. An UL system BW includes $N_{RB}^{UL}$ RBs. Each RB includes $NR_{sc}^{RB}$ SCs. The UE 116 is assigned $M_{PUXCH}$ RBs for a total of $M_{sc}^{PUXCH}=M_{PUXCH} \cdot N_{sc}^{RB}$ SCs 465 for a PUSCH transmission BW ('X'='S') or for a PUCCH transmission BW ('X'='C'). One or more of last slot symbols can be used to multiplex SRS transmissions 470 from the UE 116.

Figure 5A:
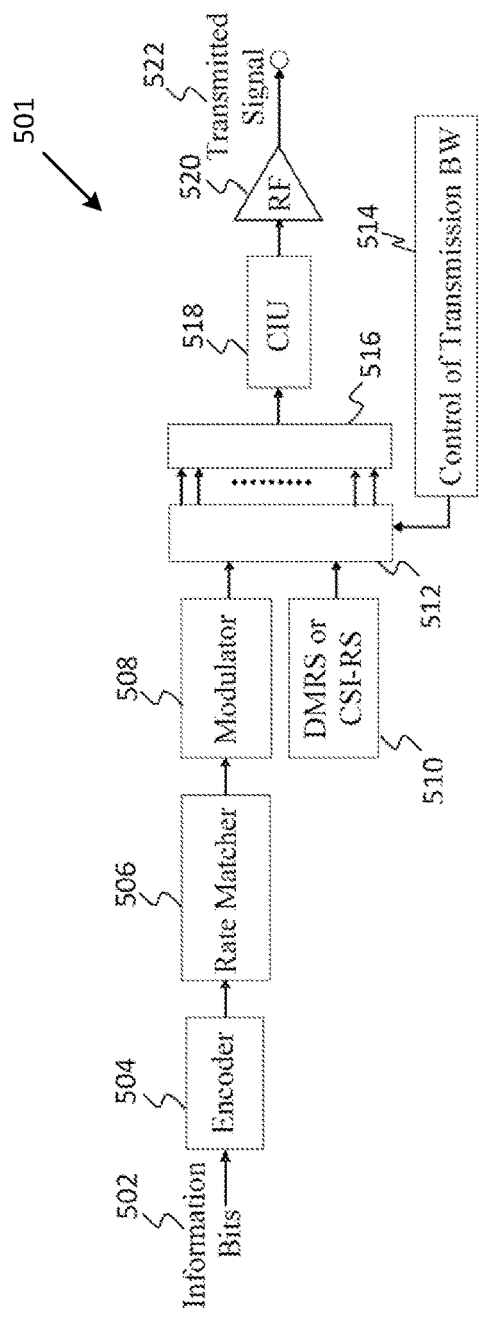
FIG. 5A illustrates an example transmitter structure according to various embodiments of the present disclosure.

A hybrid slot can include a DL transmission region, a guard period region, and an UL transmission region. For example, a DL transmission region can contain PDCCH and PDSCH transmissions and an UL transmission region can contain PUCCH transmissions. For example, a DL transmission region can contain PDCCH transmissions and an UL transmission region can contain PUSCH and PUCCH transmissions. DL transmissions and UL transmissions can be based on an orthogonal frequency division multiplexing (OFDM) waveform including a variant using DFT preceding that is known as DFT-spread-OFDM FIG. 5A illustrates an example transmitter structure according to various embodiments of the present disclosure. The example transmitter structure 501 illustrated in FIG. 5A is for illustration only and should not be construed as limiting. FIG. 5A does not limit the scope of the present disclosure to any particular transmitter structure. One or more of the components illustrated in FIG. 5A can be implemented in specialized circuitry configured to perform the noted functions or one or more of the components can be implemented by one or more processors executing instructions to perform the noted functions. For example, the transmitter structure 501 can be implemented in a UE 111-116 or a gNB 101-103 that implements the transmit path 200. Other embodiments can be used without departing from the scope of the present disclosure.

Information bits, such as control bits or data bits 502, are encoded by an encoder 504, rate matched to assigned time/frequency resources by a rate matcher 506 and modulated by a modulator 508. Subsequently, modulated encoded symbols and DMRS 510 are mapped to SCs 512 by SC mapping unit 514, an inverse fast Fourier transform (IFFT) is performed by filter 516, a cyclic prefix (CP) is added by CP insertion unit 518, and a resulting signal 522 is filtered by a filter and transmitted by a radio frequency (RF) unit 520.

Figure 5B:
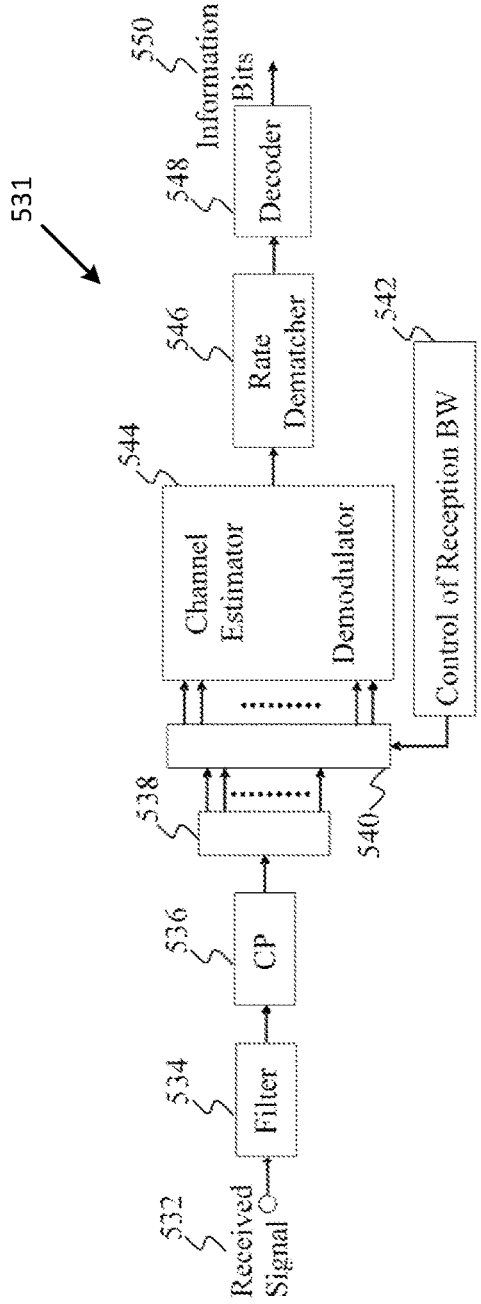
FIG. 5B illustrates an example receiver structure according to various embodiments of the present disclosure.

FIG. 5B illustrates example receiver structure using OFDM according to various embodiments of the present disclosure. The example receiver structure 531 illustrated in FIG. 5B is for illustration only and should not be construed as limiting. FIG. 5B does not limit the scope of the present disclosure to any particular receiver structure. One or more of the components illustrated in FIG. 5B can be implemented in specialized circuitry configured to perform the noted functions or one or more of the components can be implemented by one or more processors executing instructions to perform the noted functions. For example, the receiver structure 531 can be implemented in a UE 111-116 or a gNB 101-103 that implements the receive path 250. Other embodiments can be used without departing from the scope of the present disclosure.

As illustrated in FIG. 5B, a received signal 532 is filtered by filter 534, a CP removal unit 536 removes a CP, a filter 538 applies a fast Fourier transform (FFT), SCs de-mapping unit 540 de-maps SCs selected by BW selector unit 542, received symbols are demodulated by a channel estimator and a demodulator unit 544, a rate de-matcher 546 restores a rate matching, and a decoder 548 decodes the resulting bits to provide information bits 550.

A PUSCH transmission power from a UE can be set with an objective to achieve a reliability target for associated data by achieving a respective target received SINR at a serving cell of a gNB while controlling interference to neighboring cells. UL power control (PC) includes open-loop PC (OLPC) with cell-specific and UE-specific parameters and closed-loop PC (CLPC) corrections provided to the UE by the gNB through transmission PC (TPC) commands.

When a PUSCH transmission is scheduled by a PDCCH, a TPC command is included in a respective DCI format. When the UE transmits a PUSCH on active UL BWP b of carrier f of serving cell c using parameter set configuration with index j and PUSCH power control adjustment state with index l, the UE determines a PUSCH transmission power $P_{PUSCH,b,f,c}(i,j,q_d,l)$ in PUSCH transmission occasion i as Equation 1 is satisfied.

$$P_{PUSCH,b,f,c}(i, j, q_d, l) = \min\left\{\begin{array}{l}P_{CMAX,f,c}(i), \\ P_{O\_PUSCH,b,f,c}(j) + 10\log_{10}\left(2^\mu \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l)\end{array}\right\}[\text{dBm}]$$

Equation 1

In Equation 1, $P_{CMAX,f,c}(i)$ is the UE maximum output power in PUSCH transmission occasion i. $P_{O\_PUSCH,b,f,c}(j)$ is a parameter composed of the sum of a component $P_{O\_NOMINAL\_PUSCH,f,c}(j)$ and, when provided, a component $P_{O\_UE\_PUSCH,b,f,c}(j)$ where $j \in \{0, 1, \ldots, J-1\}$. The UE can be provided a set of $P_{O\_UE\_PUSCH,b,f,c}(j)$ values and, when the PUSCH transmission is scheduled by a DCI format that includes an SRS resource indicator (SRI) field, obtain a $P_{O\_UE\_PUSCH,b,f,c}(j)$ value from the set of values based on an indication by the SRI field in the DCI format. $\alpha_{b,f,c}(l)$ can be provided by higher layers; otherwise, $\alpha_{b,f,c}(j)=1$. The UE can be provided a set of $\alpha_{b,f,c}(j)$ values and obtain a value from the set of values and, when the PUSCH transmission is scheduled by a DCI format that includes an SRI field, obtain a $\alpha_{b,f,c}(j)$ value from the set of values based on an indication by the SRI field in the DCI format. $M_{RB,b,f,c}^{PUSCH}(i)$ is the bandwidth of the PUSCH resource assignment expressed in number of resource blocks for PUSCH transmission occasion i and μ is a sub-carrier spacing (SCS) configuration where a SCS for the PUSCH transmission is equal to $2^\mu \cdot 15$ kHz. $PL_{b,f,c}(q_d)$ is a downlink pathloss estimate in dB calculated by the UE using reference signal (RS) with index $q_d$. The UE can be provided a set of RS indexes and obtain an index $q_d$ from the set of indexes from a value of an SRI field in DCI format 0_1. $\Delta_{TF,b,f,c}(i) = 10 \log_{10} ((2^{BPRE \cdot K_s}-1) \cdot \beta_{offset}^{PUSCH})$ when $K_S$ is not zero, such as for example $K_S=1.25$, and $\Delta_{TF,b,f,c}(i)=0$ for $K_S=0$ where $K_S$ is provided by higher layers. If the PUSCH transmission is over more than one layer, $\Delta_{TF,b,f,c}(i)=0$. For the PUSCH power control adjustment state $f_{b,f,c}(i, l)$ in PUSCH transmission occasion i, $\delta_{PUSCH,b,f,c}(i,l)$ is a TPC command value included in a DCI format that schedules the PUSCH transmission occasion i or jointly coded with other TPC commands in a DCI format with CRC scrambled by TPC-PUSCH-RNTI. $l \in \{0, 1\}$ if the UE is configured with two closed loop power control states; otherwise, l=0. When $l \in \{0, 1\}$, the UE can obtain a value l from a value of an SRI field in DCI format, when any; otherwise, l=0.

$$f_{b,f,c}(i, l) = f_{b,f,c}(i - i_0, l) + \sum_{m=0}^{C(D_i)-1} \delta_{PUSCH,b,f,c}(m, l)$$

is the PUSCH power control adjustment state l for PUSCH transmission occasion i when the UE accumulates TPC commands.

$$\sum_{m=0}^{C(D_i)-1} \delta_{PUSCH,b,f,c}(m, l)$$

is a sum of TPC command values in a set $D_i$ of TPC command values with cardinality $C(D_i)$ that the UE receives between $K_{PUSCH}(i-i_0)-1$ symbols before PUSCH transmission occasion $i-i_0$ and $K_{PUSCH}(i)$ symbols before PUSCH transmission occasion i for PUSCH power control adjustment state l, where $i_0>0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i. If a PUSCH transmission is scheduled by a DCI format that includes a TPC command, $K_{PUSCH}(i)$ is a number of symbols after a last symbol of a corresponding PDCCH reception and before a first symbol of the PUSCH transmission.

When a UE transmits a PUCCH on active UL BWP b of carrier f on the primary cell c using PUCCH power control adjustment state with index l, the UE determines the PUCCH transmission power $P_{PUCCH,b,f,c}(i, q_u, q_d, l)$ in PUCCH transmission occasion i as Equation 2 is satisfied.

Equation 2

$$P_{PUCCH,b,f,c}(i, q_u, q_d, l) = \min\left\{\begin{array}{l}P_{CMAX,f,c}(i), \\ P_{O\_PUSCH,b,f,c}(j) + 10\log_{10}\left(2^\mu \cdot M_{RB,b,f,c}^{PUSCH}(i)\right) + \\ \Delta_{F\_PUCCH}(F) + \Delta_{TF,b,f,c}(i) + g_{b,f,c}(i, l)\end{array}\right\}[\text{dBm}]$$

In Equation 2, $P_{CMAX,f,c}(i)$ is the UE maximum output power in PUCCH transmission occasion i. $P_{O\_PUCCH,b,f,c}(q_u)$ is a parameter composed of the sum of a component $P_{O\_NOMINAL\_PUCCH}$ and, when provided, a component $P_{O\_UE\_PUCCH}(q_u)$ where $0 \le q_u < Q_u$. $Q_u$ is a size for a set of $P_{O\_UE\_PUCCH}$ values. The UE can obtain a value from the set of $P_{O\_UE\_PUCCH}$ values through a link to a corresponding resource for the PUCCH transmission. $M_{RB,b,f,c}^{PUCCH}(i)$ is a bandwidth of the PUCCH resource assignment expressed in number of resource blocks for PUCCH transmission occasion i and μ is a SCS configuration. $PL_{b,f,c}(q_d)$ is a downlink pathloss estimate in dB calculated by the UE using RS resource index $q_d$. The RS resource can be a SS/PBCH block or a CSI-RS. If the UE is provided a number of RS resource indexes, the UE calculates $PL_{b,f,c}(q_d)$ using RS resource with index $q_d$, where $0 \le q_d < Q_d$. The UE can determine a RS resource index based on the resource used for the PUCCH transmission. The parameter $\Delta_{F\_PUCCH}(F)$ is provided by higher layers for a corresponding PUCCH format.

$\Delta_{TF,b,f,c}(i)$ is a PUCCH transmission power adjustment component on active UL BWP b of carrier f of primary cell c. For the PUCCH power control adjustment state $g_{b,f,c}(i,l)$ for active UL BWP b of carrier f of primary cell c and PUCCH transmission occasion i, $\delta_{PUCCH,b,f,c}(i, l)$ is a TPC command value included in a DCI format that the UE detects for PUCCH transmission occasion i or is jointly coded with other TPC commands in a DCI format with CRC scrambled by TPC-PUCCH-RNTI. $l \in \{0, 1\}$ when the UE is configured for two power control adjustment states; otherwise, l=0.

$$g_{b,f,c}(i, l) = g_{b,f,c}(i - i_0, l) + \sum_{m=0}^{C(C_i)-1} \delta_{PUCCH,b,f,c}(m, l)$$

is the current PUCCH power control adjustment state l for PUCCH transmission occasion i, where $$\sum_{m=0}^{C(C_i)-1} \delta_{PUCCH,b,f,c}(m, l)$$

is a sum of TPC command values in a set $C_i$ of TPC command values with cardinality $C(C_i)$ that the UE receives between $K_{PUCCH}(i-i_0)-1$ symbols before PUCCH transmission occasion $i-i_0$ and $K_{PUCCH}(i)$ symbols before PUCCH transmission occasion i for PUCCH power control adjustment state l, where $i_0>0$ is the smallest integer for which $K_{PUCCH}(i-i_0)$ symbols before PUCCH transmission occasion $i-i_0$ is earlier than $K_{PUCCH}(i)$ symbols before PUCCH transmission occasion i.

A UE can report HARQ-ACK information in response to decoding outcomes for TB s in corresponding PDSCH receptions, or in response to a SPS PDSCH release, for example using a Type-1 HARQ-ACK codebook or a Type-2 HARQ-ACK codebook. When the UE multiplexes a HARQ-ACK codebook in a PUCCH transmission, a timing and a PUCCH resource for the PUCCH transmission can be provided by respective fields in DCI formats scheduling associated PDSCH receptions or SPS PDSCH release relative to slots of PUCCH transmissions.

PUCCH transmissions from a UE can overlap in time. In such instances, the UE can multiplex the corresponding UCI in a single PUCCH resource. For example, when a first PUCCH transmission with HARQ-ACK information overlaps in time with a second PUCCH transmission with CSI, the UE can be configured by higher layers to multiplex the HARQ-ACK information and the CSI in a single PUCCH transmission. Accordingly, the UE can determine a new PUCCH resource for the PUCCH transmission with the HARQ-ACK information and the CSI. Similar, when a first PUCCH with HARQ-ACK information overlaps in time with a second PUCCH with SR, the UE determines a new PUCCH resource to transmit a single PUCCH that includes both the HARQ-ACK information and the SR.

Data rates or reception reliability at a UE for a DCI format or for a TB can improve when the associated PDCCH or PDSCH transmissions providing the DCI format or the TB occur from multiple transmission points of a serving cell. Similar, a reception reliability at a gNB for UCI or for a TB can improve when the associated PUCCH or PUSCH providing the UCI or the TB are received by multiple reception points of a serving cell. In this manner, reception reliability at a gNB is improved for cell edge UEs. A DL throughput can also increase when multiple transmission points transmit respective multiple TB s to the UE. The UE communication with multiple transmission/reception points (TRPs) is referred to as multi-TRP communication and can intrinsically provide a boundary-less experience for UEs supporting mobility as associated TRPs can be updated without using a hard handover.

Multi-TRP communication can benefit applications requiring enhanced reliability, such as applications associated with ultra-reliable low-latency communications (URLLC) or applications requiring enhanced mobility support such as vehicular communications (V2X). Multi-TRP communication can offer time, frequency, and/or spatial diversity to channel or interference conditions for transmission/reception of same control or data information. Multi-TRP communication can be associated with non-coherent joint transmission (NCJT) as amplitude and phase mismatches are challenging to avoid in practice, transceiver RF chains at different TRPs may not be identical, and coherent combining of corresponding receptions is then disadvantageous. For NCJT, the scheduling and the precoder used at different TRPs can be independent. The UE can provide CSI feedback for each TRP as when the UE receives from a single transmission point or transmits to a single reception point.

A UE can receive same or different TB s from multiple TRPs to respectively increase a reception reliability or a data rate. When the UE receives same or different TB s from multiple TRPs, the UE can provide corresponding HARQ-ACK information to the TRPs. When a backhaul link among TRPs does not incur material latency, the UE can provide the HARQ-ACK information in a same HARQ-ACK codebook that the UE multiplexes in a PUCCH or PUSCH transmission. When the backhaul link among TRPs incurs material latency, the UE can provide the HARQ-ACK information in separate HARQ-ACK codebooks that the UE multiplexes in separate PUCCH or PUSCH transmissions.

When a UE receives a same TB from multiple TRPs, the size of a corresponding HARQ-ACK codebook can be reduced when the UE does not provide separate HARQ-ACK information for each of the multiple TRPs, regardless of a correct or incorrect outcome for the TB reception from a particular TRP. Further, when the UE provides the HARQ-ACK information in a same HARQ-ACK codebook, the UE enables both TRPs to reliably detect the HARQ-ACK codebook in a corresponding PUCCH or PUSCH reception. In addition, when scheduling at the multiple TRPs is not tightly coordinated, a first TRP can schedule a PUSCH transmission from a UE prior to a second TRP scheduling a PDSCH reception by the UE where the UE is indicated to multiplex HARQ-ACK information for the PDSCH reception in a PUCCH transmission that overlaps with the PUSCH transmission.

Accordingly, various embodiments of the present disclosure recognize and consider the advantages of determining a spatial setting for a PUCCH transmission when the UE is configured for communication with a set of more than one TRPs on a serving cell. Embodiments of the present disclosure further recognize and consider the advantages of defining a procedure for a PUCCH transmission when a UE transmits multiple PUCCHs to respective multiple TRPs where the PUCCH transmissions can have different spatial settings and would overlap in time. Embodiments of the present disclosure further recognize and consider the advantages of determining a power for a PUCCH transmission when the UE is configured for communication with multiple TRPs.

In addition, various embodiments of the present disclosure recognize and consider the advantages of reducing a size of HARQ-ACK information a UE provides to multiple TRPs for a reception, including no reception, of a same TB from each of the multiple TRPs. Further, various embodiments of the present disclosure recognize and consider the advantages of defining a prioritization for signal/channel transmissions from a UE when the UE would simultaneously transmit multiple signals/channels to different TRPs where the multiple signals/channels can have different spatial settings without the UE having a corresponding capability for such simultaneous transmissions.

As described herein, a configuration for communication with multiple TRPs implies configuration of groups of CORESETs, or of search space sets, for PDCCH monitoring for scheduling PDSCH receptions by or PUSCH transmissions from a UE on a cell. In the following, when referring for brevity to receptions from or transmissions to a TRP, the receptions or the transmissions are scheduled by DCI formats provided by PDCCH receptions in a group of CORESETs. If receptions or transmissions that are not scheduled by DCI formats, higher layers configuring the receptions or transmissions also configure an association with a CORESET group. A PRACH transmission can be considered to be associated with CORESET group 0.

Various embodiments of the present disclosure enable the determination of a spatial setting for a PUCCH transmission from a UE, such as the UE 116, when the UE 116 is configured for communication with a set of more than one TRPs on a serving cell such as a primary cell. For example, the UE 116 can be configured with an index for each TRP from a set of TRPs and the UE 116 can transmit the PUCCH. The set of TRPs can include more than on TRP. The index of the TRP can be linked to an index of a group of CORESETs associated with search space sets configured to the UE 116 for PDCCH receptions or to an index of a group of search space sets. For example, a first TRP has index 0 is linked to a first CORESET group that has index 0 and a second TRP has index 1 and is linked to a second CORESET that has index 1. Accordingly, a TRP can be defined by a group of CORESETs or by a group of search space sets. When only CORESET group 0 is configured to the UE 116, or otherwise determined by default by the UE 116 such when there is no group configuration for a CORESET, the TRP for PUCCH transmissions can be the one with a smallest index, such as an index zero, referred to as primary TRP. The PUCCH can include HARQ-ACK information corresponding to PDSCH receptions from TRPs from the sets of TRPs, CSI reports for TRPs from the set of TRPs, and SR.

The UE 116 can determine a power for a PUCCH transmission based on the parameters for the associated TRP. In particular, the UE 116 can determine a downlink pathloss estimate $PL_{b,f,c}(q_d)$ using RS resource index $q_d$ that is associated with the TRP of the PUCCH transmission. Due to UE mobility or variation in a channel medium or interference, a preferred spatial setting for a PUCCH transmission can vary and a spatial setting configured by higher layers can then be inaccurate. Accordingly, embodiments of the present disclosure can enable an indication of a spatial setting for each PUCCH transmission by a UE to include a spatial setting index, from a set of spatial setting indexes, in the set of parameters defining a PUCCH resource.

In one embodiment, for PDSCH receptions scheduled by a DCI format in a PDCCH reception, including activation of SPS PDSCH reception, the field in the DCI format indicating a PUCCH resource can also indicate a spatial setting for the PUCCH transmission. By indicating a spatial setting for the PUCCH transmission, the PUCCH reception reliability can be robust to changes in the preferred spatial setting. An indication of a different spatial setting for a PUCCH transmission can also enable the UE 116 to apply a different pathloss estimate for the PUCCH transmission through a link between a RS resource index the UE 116 uses for the pathloss calculation and a spatial setting for the PUCCH transmission, for example through a TCI state of a CORESET, such as for example a common TCI state for a CORESET, a RS, and PUCCH associated with a PDCCH reception in the CORESET, or through an explicit link by higher layer signaling.

Figure 6:
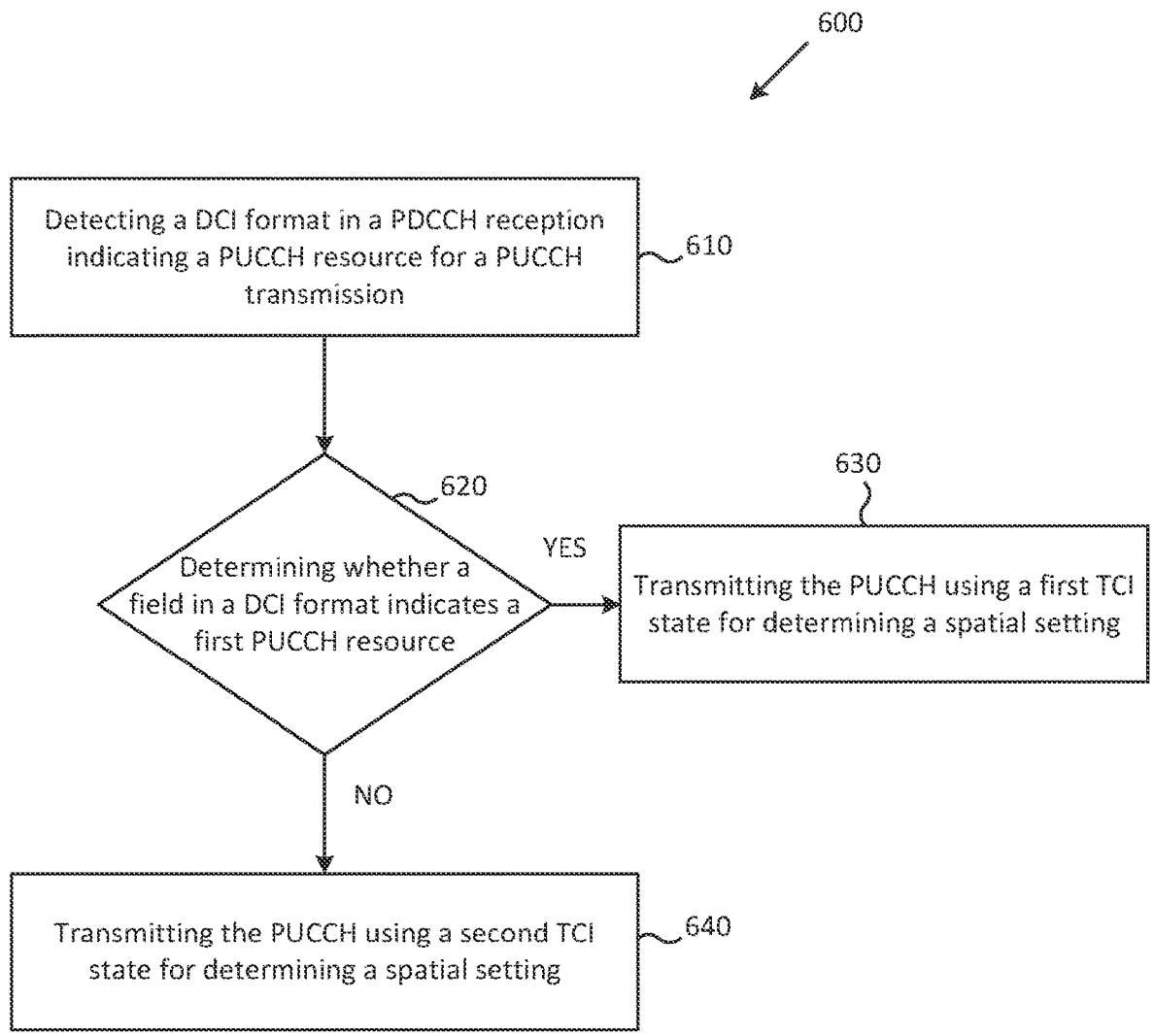
FIG. 6 illustrates a flowchart for a method of determining a spatial setting for a PUCCH transmission based on a PUCCH resource according to various embodiments of the present disclosure.

FIG. 6 illustrates a method of determining a spatial setting for a PUCCH transmission based on a PUCCH resource according to various embodiments of the present disclosure. Although described herein as being implemented by the UE 116, the method 600 illustrated in FIG. 6 can be implemented by one or more of the UEs 111-116 and a corresponding method can be performed by one or more of the gNBs 101-103 described in FIG. 1. Other embodiments can be used without departing from the scope of the present disclosure.

In operation 610, a UE, such as the UE 116, detects a DCI format in a PDCCH reception. The DCI format indicates a PUCCH resource for a PUCCH transmission with HARQ-ACK information. In some embodiments, the DCI format is a last DCI format that the UE 116 detects for a determination of a HARQ-ACK codebook to multiplex in the PUCCH transmission.

In operation 620, the UE 116 determines whether a field in the DCI format indicates a first PUCCH resource. If the field in the DCI format indicates the first PUCCH resource, the UE 116 proceeds to operation 630. If the field in the DCI format does not indicate the first PUCCH resource, the UE 116 proceeds to operation 640.

The first PUCCH resource includes a first TCI state as the value of a TCI state parameter of a PUCCH resource. In response to the UE 116 determining that the field hr the DCI format indicates the first PUCCH resource in operation 620, in operation 630 the UE 116 transmits the PUCCH using the first TO state for determining a spatial setting.

In response to the UE 116 determining that e field in the DCI format does not indicate the first PUCCH resource in operation 620, the UE 116 determines the field in the DCI format indicates a second PUCCH resource that includes a second TCI state as the value of the TCI state parameter of a PUCCH resource. In operation 640, the UE 116 transmits the PUCCH using the second TCI state for determining a spatial setting.

In another embodiment, to enable the indication, the UE 116 can be provided with a mapping between a set of TCI states/spatial settings for a PUCCH transmission and a group of CORESETs. The mapping can be stored in the memory 360 or received from a gNB, such as the gNB 102. The UE 116 can determine the TCI state for a PUCCH transmission with HARQ-ACK information based on the CORESET where the UE 116 detects a last DCI format that triggers the PUCCH transmission. The RS used by the UE to determine a pathloss can also be associated with the CORESET where the UE detects a last DCI format that triggers the PUCCH transmission. The association can be provided by higher layers, where the UE is configured to use first and second spatial settings for PUCCH transmissions associated with DCI formats provided by PDCCH receptions in CORESETs of the first and second groups of CORESETs, or can be through a TCI state for the CORESET and the RS. For example, the RS can have a same TCI state as the CORESET. Therefore, based on the TCI state associated with a PUCCH resource, UE 116 can determine a RS to use for a pathloss measurement that the UE 116 applies for a determination of a PUCCH transmission power.

In another embodiment, to enable the indication, a DCI format scheduling a PDSCH reception by the UE 116, such as a DCI format 1_1, can include a field indicating a TCI state for an associated PUCCH transmission. The UE 116 can be configured with a mapping among values of the DCI format field and spatial settings from a set of spatial settings. The mapping can be stored in the memory 360 or received from the gNB 102 by higher layer signaling. For example, a field of 2 bits can indicate a first, second, third, or fourth spatial setting from a set of four spatial settings. The UE 116 can also be configured by higher layers with a spatial setting to use for a PUCCH transmission when a PDSCH reception is scheduled by a DCI format, such as a DCI format 0_0 in a CSS set or in a USS set, that does not include the field. For example, the spatial setting can be the first spatial setting from the set of four spatial settings. It is also possible that a spatial setting for a PUCCH transmission in a resource indicated by a DCI format that does not provide an implicit or explicit indication for a spatial setting is determined by a TCI state of a SS/PBCH block the UE 116 detects for obtaining system information and establishing RRC connection on a cell (cell-defining SS/PBCH block). That TCI state can also correspond to the first spatial setting in a set of spatial settings (and higher layer signaling can provide remaining spatial settings in the set of spatial settings). In this embodiment, the UE 116 can detect multiple DCI formats scheduling PDSCH receptions and indicating a same time period, such as a slot, for a PUCCH transmission with corresponding HARQ-ACK information. The UE can apply the spatial setting indicated in a last DCI format from the multiple DCI formats for an associated PUCCH transmission. For example, an order of DCI formats can be defined first in ascending order of TRP (CORESET group) index, then in ascending order of serving cell index, and then in ascending order of PDCCH monitoring occasion index. For example, an order of DCI formats can be defined first in ascending order of serving cell index, then in ascending order of PDCCH monitoring occasion index, and then in ascending order of TRP (CORESET group) index.

Figure 7:
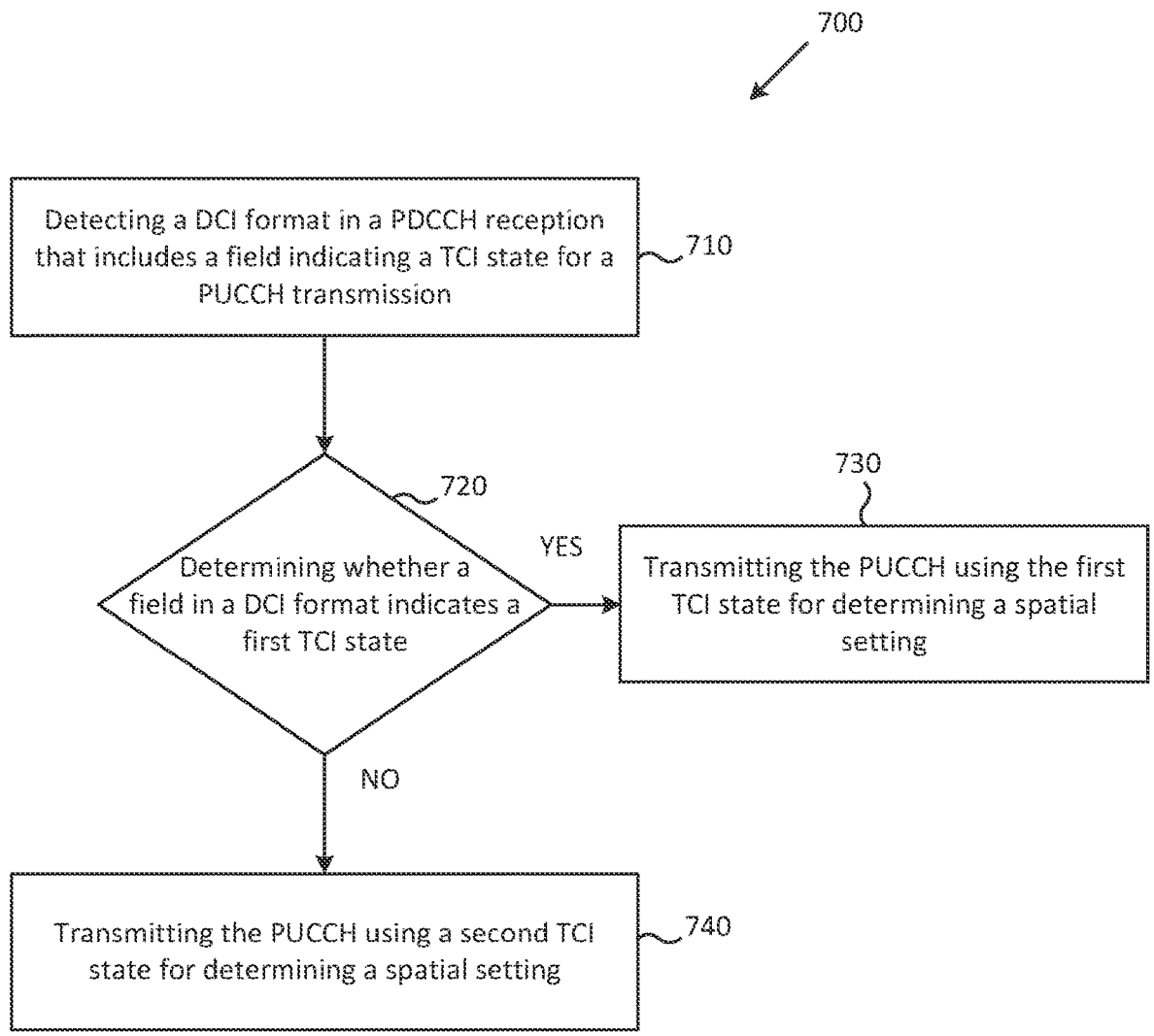
FIG. 7 illustrates a flowchart for a method of determining a spatial setting for a PUCCH transmission based on explicit indication by a DCI format according to various embodiments of the present disclosure.

FIG. 7 illustrates a method of determining a spatial setting for a PUCCH transmission based on explicit indication by a DCI format according to various embodiments of the present disclosure. Although described herein as being implemented by the UE 116, the method 700 illustrated in FIG. 7 can be implemented by one or more of the UEs 111-116 and a corresponding method can be performed by one or more of the gNBs 101-103 described in FIG. 1. Other embodiments can be used without departing from the scope of the present disclosure.

In operation 710, a UE, such as the UE 116, detects a DCI format in a PDCCH reception that triggers a PUCCH transmission and includes a field indicating a TCI state for the PUCCH transmission. The indication can be included in a mapping of field values to a configured set of TCI states. In some embodiments, the mapping can be stored in the memory 360 or received from a gNB, such as the gNB 102. In some embodiments, the DCI format is a last DCI format that the UE 116 detects for a determination of a HARQ-ACK codebook to multiplex in the PUCCH transmission.

In operation 720, the UE 116 determines whether the field in the DCI format indicates a first TCI state. In response to the UE 116 determining the field in the DCI format indicates a first TCI state, the UE 116 proceeds to operation 730. In response to the UE 116 determining the field in the DCI format does not indicate the first TCI state, the UE 116 determines the field indicates a second TCI state and proceeds to operation 740.

In operation 730, in response to determining the field in the DCI format indicates a first TCI state, the UE 116 transmits the PUCCH using the first TCI state for determining a spatial setting. The UE 116 determines a PUCCH transmission power using a pathloss measurement associated with the spatial setting indicated by the first TCI state. In operation 740, in response to determining the field in the DCI format indicates a second TCI state, the UE 116 transmits the PUCCH using the second TCI state for determining a spatial setting. The UE 116 determines a PUCCH transmission power using a pathloss measurement associated with the spatial setting indicated by the second TCI state.

As described herein, the procedure of multiplexing UCI from PUCCH transmissions that would overlap in time into a single PUCCH transmission assumes that the PUCCH transmissions that would overlap in time have same spatial setting, for example a spatial setting configured to the UE 116 by higher layer signaling for all PUCCH transmissions. When PUCCH transmissions that would overlap in time have different spatial settings, and the UE 116 does not simultaneously transmit more than one PUCCHs with different spatial settings, multiplexing into a single PUCCH transmission can either be precluded in the specification of the system operation or be configured, such as enabled or disabled, by higher layer signaling.

In some embodiments, multiplexing of UCI, from PUCCH transmissions with different spatial settings (TCI states) that would overlap in time, a PUCCH transmission by the UE 116 can be precluded by specification or can be disabled by higher layer signaling. In these embodiments, the UE 116 can determine a PUCCH to transmit based on a UCI type included in the PUCCH or based on an index of a TRP (CORESET group index) associated with the PUCCH. For example, when the PUCCH transmissions with different spatial settings that would overlap in time include a same UCI type, the UE 116 transmits the PUCCH to the TRP with a lowest index (CORESET group with a lowest index) such as a primary TRP (first CORESET group or CORESET group with index 0). When only one of the PUCCH transmissions with different spatial settings that would overlap in time includes HARQ-ACK information, the UE 116 transmits the PUCCH with the HARQ-ACK information.

When the PUCCH transmissions with different spatial settings that would overlap in time include a same UCI type but with different priorities, the UE 116 transmits the PUCCH with the UCI type having a higher priority. When the UCI type is HARQ-ACK information, a priority can be associated with a priority indicated by or associated with a DCI format scheduling a PDSCH associated with the HARQ-ACK information. For example, the UE 116 can identify the priority of the DCI format based on a priority indication field in the DCI format, based on an RNTI of the DCI format, or based on a size of the DCI format, or based on the DCI format, and so on. When the PUCCH transmissions with different spatial settings that would overlap in time include a same UCI type but with different priorities, the UE 116 transmits the PUCCH with the UCI type having a higher priority.

When the UE 116 would transmit time overlapping PUCCHs with same spatial settings, multiplexing of UCI in a single PUCCH transmission can be enabled even when associated TRPs use different spatial settings, such as different TCI states, for transmissions to the UE 116. For example, the UE 116 can determine a first PUCCH resource to transmit a first PUCCH with first HARQ-ACK information based on DCI formats in PDCCH receptions in CORE- SETs associated with a first TRP (first CORESET group) and determine a second PUCCH resource to transmit a second PUCCH with second HARQ-ACK information based on DCI formats in PDCCH receptions in CORESETs associated with a second TRP (second CORESET group). The first and second PUCCH resources can overlap in time. The UE 116 can further determine a PUCCH resource for multiplexing the first and second HARQ-ACK information in a PUCCH and transmit the PUCCH with a power determined according to the parameters associated with a PUCCH transmission to the TRP with the lowest index (CORESET group 0) such as the primary TRP.

Figure 8:
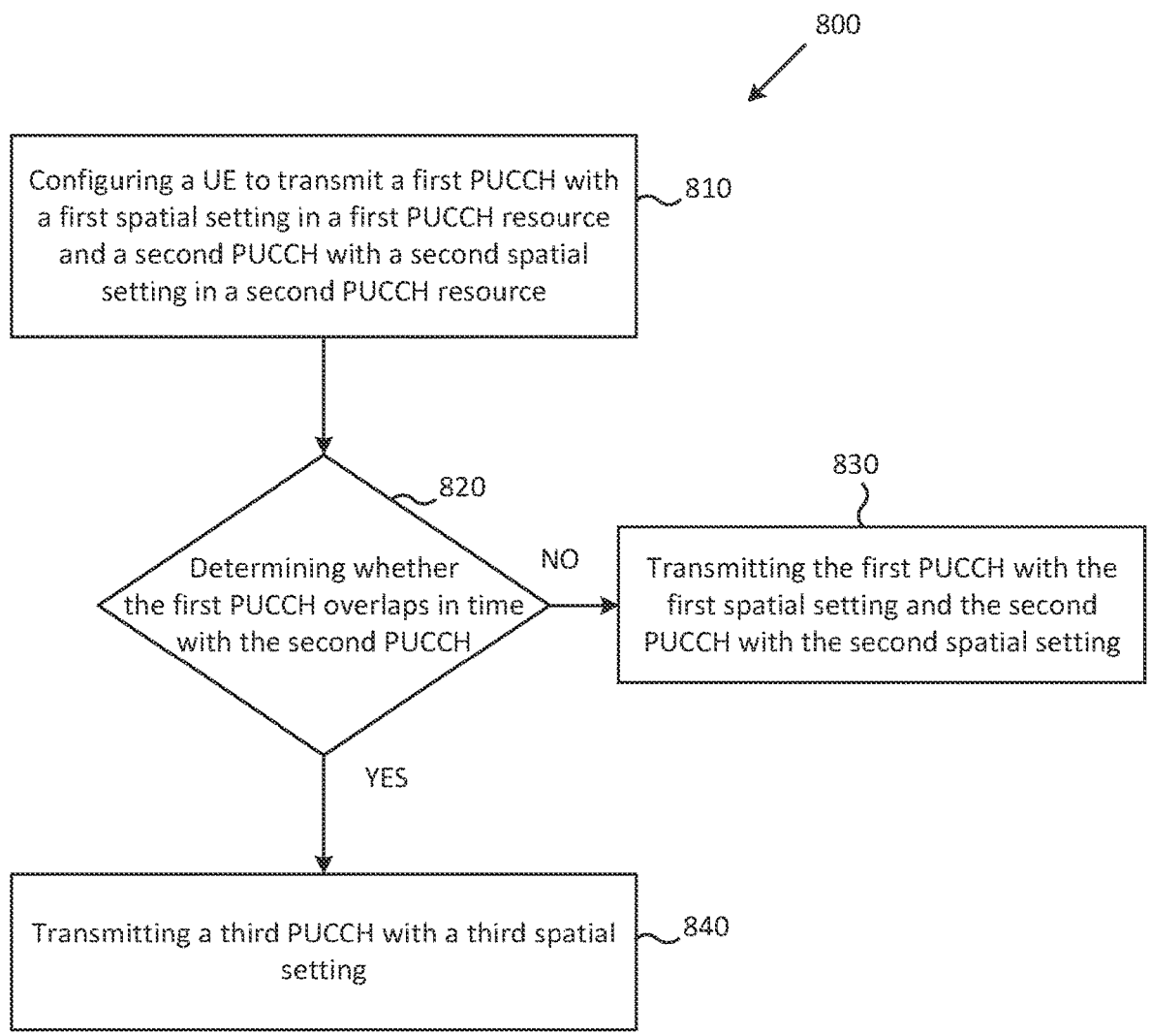
FIG. 8 illustrates a flowchart for a method of multiplexing UCI in a PUCCH transmission according to various embodiments of the present disclosure.

FIG. 8 illustrates a method of multiplexing UCI in a PUCCH transmission according to various embodiments of the present disclosure. Although described herein as being implemented by the UE 116, the method 800 illustrated in FIG. 8 can be implemented by one or more of the UEs 111-116 and a corresponding method can be performed by one or more of the gNBs 101-103 described in FIG. 1. Other embodiments can be used without departing from the scope of the present disclosure.

In operation 810, a UE, such as the UE 116, is configured to transmit a first PUCCH with a first spatial setting, such as a TCI state, in a first PUCCH resource to a first TRP and a second PUCCH with a second spatial setting in a second PUCCH resource to a second TRP. In various embodiments, the UE 116 can be configured by a DCI format received in a PDCCH reception or received by higher layer signaling, such as from a gNB 102.

In operation 820, the UE 116 determines whether a transmission of the first PUCCH would overlap in time with a transmission of the second. PUCCH. If the UE 116 determines the transmission of the first PUCCH would not overlap in time with a transmission of the second PUCCH, the UE 116 proceeds to operation 830. If the UE 116 determines the transmission of the first PUCCH would overlap in time with a transmission of the second PUCCH, the UE 116 proceeds to operation 840.

In operation 830, based on the UE 116 determining the transmission of the first PUCCH would not overlap in time with a transmission of the second PUCCH, the UE 116 transmits the first PUCCH with the first spatial setting and the second PUCCH with the second spatial setting.

In operation 840, based on the UE 116 determining the transmission of the first PUCCH would overlap in time with a transmission of the second PUCCH, the UE 116 multiplexes the UCI from the first and second PUCCHs into a third PUCCH and determines a third PUCCH resource for the PUCCH transmission using a third spatial setting. The UE 116 then transmits the third PUCCH with the third spatial setting. The third spatial setting can be provided to the UE 116 by a serving gNB, such as the gNB 102, by higher layer signaling or can be saved in the memory 360, for example to be same as the first spatial setting or same as a spatial setting of a PRACH transmission the UE 116 used during initial access with the serving gNB 102. In case the spatial setting of the PUCCH transmission is predetermined, such as a first spatial setting, UE 116 may also consider only PUCCH resources associated with the first spatial setting for determining a PUCCH resource to multiplex the UCI.

Various embodiments of the present disclosure enable the ion of a power for a PUCCH transmission depending on an associated TRP (CORESET group) or depending on a spatial setting for the PUCCH transmission. For example, a UE, such as the UE 116 can be configured with first search space sets for PDCCH receptions in a first group of CORESETs that provide DCI formats scheduling PDSCH receptions from a first TRP and second search space sets for PDCCH receptions in a second group of CORESETs that provide DCI formats scheduling PDSCH receptions from a second TRP. PDCCH receptions or PDSCH receptions from the two TRPs can be with different TCI states. In response to PDSCH receptions from the first and second TRPs, that is PDSCH receptions scheduled by DCI formats in PDCCH receptions in the first and second groups of CORESETs, the UE 116 can be configured to transmit corresponding HARQ-ACK information in a PUCCH. The spatial setting of the PUCCH transmission can be such that both TRPs can reliably receive the HARQ-ACK information.

In some embodiments, such as when the UE 116 transmits the PUCCH only to the first TRP, the UE 116 determines a power for the PUCCH transmission based on corresponding parameter settings associated with the first TRP (first group of CORESETs). For example, the UE 116 would determine a pathloss based on a RS resource index $q_d$ for the active DL BWP b of carrier f of the primary cell c and of a primary TRP (CORESET group 0). For example, the RS resource index $q_d$ can be obtained from a spatial setting of the PUCCH transmission through a mapping between a set RS resource indexes, such as SS/PBCH block or CSI-RS indexes, and a set of spatial settings for the PUCCH transmission. For example, the UE 116 determines a PUCCH power control adjustment state based on TPC command values provided in DCI formats the UE 116 detects in PDCCH receptions in the first group of CORESETs (CORESET group 0) and a value of the PUCCH power control adjustment state index is determined from a mapping between PUCCH power control adjustment state indexes and a set of spatial settings for the PUCCH transmission. When the UE 116 transmits the PUCCH only to the second TRP, the UE 116 determines a power for the PUCCH transmission based on corresponding parameter settings associated with the second TRP (CORESET group 1).

In some embodiments, such as when the UE 116 transmits a PUCCH that includes UCI for both the first TRP and the second TRP, a power for the PUCCH transmission needs to be such that the UCI can be reliably received by the first TRP and by the second TRP or, for example in case of ideal backhaul between the TRPs, by only one of the TRPs. In these embodiments, the second, or first, TRP does not need to rely on an existence of a backhaul with practically zero latency with the first, or second, TRP in order to obtain the corresponding UCI. In addition, even if there is a zero backhaul latency among TRPs, embodiments of the present disclosure recognize the benefits of enabling reliable UCI reception by multiple TRPs to obtain benefits of TRP diversity for the UCI reception. In particular, TRP diversity can offer diversity for the channel medium and the interference experienced by the PUCCH reception. The UE 116 can determine that a PUCCH includes UCI for both the first and second TRPs when the UE 116 detects DCI formats in corresponding PDCCH receptions in the first and second groups of CORESETs or, the PUCCH transmission is configured by higher layers, by higher layer configuration.

To enable reliable UCI reception by multiple TRPs, the UE 116 can determine a power for a corresponding PUCCH transmission to be the larger among the powers the UE 116 determines for a PUCCH transmission only to one TRP. In some embodiments, the UE 116 determines a power for a PUCCH transmission to each TRP and selects the largest power for the PUCCH transmission. In other embodiments, the UE 116 can determine only values for $PL_{b,f,c}(q_d)$ and select the largest as other parameters for the determination of a PUCCH transmission power can be common among TRPs. Alternatively, $P_{O\_PUCCH,b,f,c}(q_d)$ or $g_{b,f,c}(i,l)$ can be TRP-specific (CORESET group specific) and be included with $PL_{b,f,c}(q_d)$ in determining a PUCCH transmission power.

Figure 9:
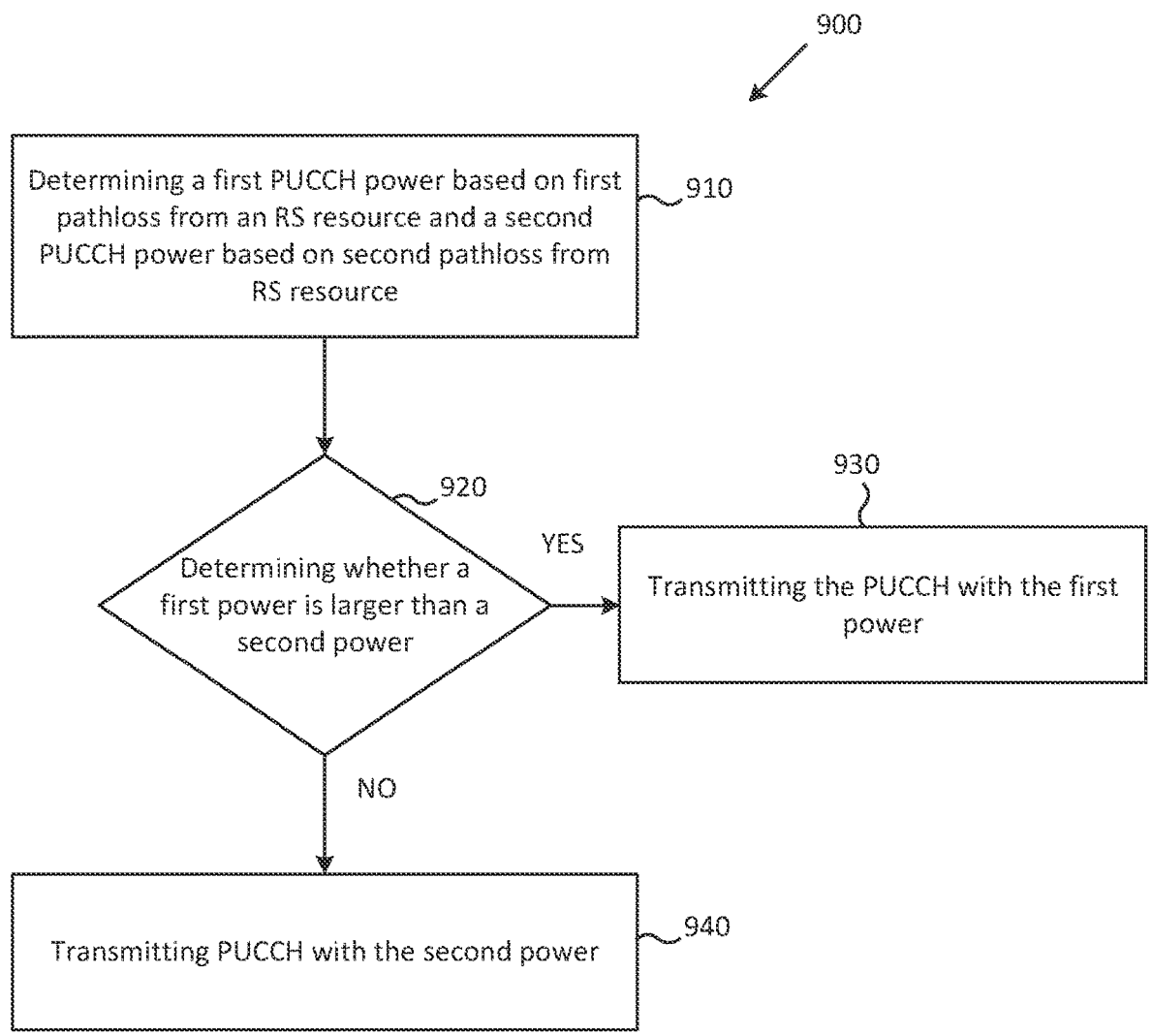
FIG. 9 illustrates a flowchart for a method of determining a PUCCH transmission power according to various embodiments of the present disclosure.

FIG. 9 illustrates a method of determining a PUCCH transmission power according to various embodiments of the present disclosure. Although described herein as being implemented by the UE 116, the method 900 illustrated in FIG. 9 can be implemented by one or more of the UEs 111-116 and a corresponding method can be performed by one or more of the gNBs 101-103 described in FIG. 1. Other embodiments can be used without departing from the scope of the present disclosure.

In operation 910, a UE, such as the UE 116, determines a first power for a PUCCH transmission based on a first pathloss estimate obtained from a RS resource associated with a first group of CORESETs, or with a first group of search space sets, and a second power for a PUCCH transmission based on a second pathloss estimate obtained from a RS resource associated with a second group of CORESETs, or with a second group of search space sets.

In operation 920, the UE 116 determines if the first power is larger than the second power. If the UE 116 determines the first power is larger than the second power, the UE 116 proceeds to operation 930. If the UE 116 determines the first power is not larger than the second power, the UE 116 proceeds to operation 940.

In operation 930, based on the UE 116 determining the first power is larger than the second power, the UE 116 transmits the PUCCH using the first power. In operation 940, based on the UE 116 determining the first power is not larger than the second power, the UE 116 transmits the PUCCH using the second power.

In some embodiments, the UE 116 can transmit a PUCCH with the smaller of the first power and the second power for a PUCCH transmission to different TRPs. This embodiment can minimize UE power consumption and an interference that the PUCCH transmission causes in neighboring cells while ensuring a UCI reception reliability at one TRP. In this embodiment, in operation 920, the UE 116 can determine whether the first power is smaller than the second power. Accordingly, if the UE 116 determines the first power is smaller than the second power, the UE 116 transmits the PUCCH using the first power and if the UE 116 determines the first power is not smaller than the second power, the UE 116 transmits the PUCCH using the second power.

In some embodiments, the UE 116 can transmit the PUCCH with a power determined for transmission to either the first TRP or to the second TRP. In other embodiments, the power can be specified in the system operation for the UE to transmit the PUCCH with a power determined for transmission to the first TRP, which is the TRP with the lowest index (associated with CORESET group 0). For example, the power can be stored in the memory 360.

The UE 116 can receive PDSCHs from multiple TRPs (scheduled by corresponding PDCCHs in multiple CORESET groups) and can be configured to transmit a PUCCH with corresponding HARQ-ACK information or, in general, with UCI only to a first TRP from the multiple TRPs (PUCCH associated with PDCCH receptions only in CORESETs of group 0). In these embodiments, the UE 116 can ignore TPC commands for determining a PUCCH transmission power in DCI formats scheduling PDSCH receptions from TRPs other than the first TRP, at least when the PDSCH receptions from the TRPs use different TCI states than the TCI state from the first TRP. Alternatively, for example for two TRPs and when a backhaul delay between the two TRPs is practically negligible, the UE 116 can include for a determination of a PUCCH transmission power TPC commands provided by DCI formats in PDCCH receptions in a first group of CORESETs and TPC commands provided by DCI formats in PDCCH receptions in a second group of CORESETs.

Whether or not the UE 116 include for a determination of a PUCCH transmission power TPC commands provided by DCI formats in PDCCH receptions in a group of CORESETs other than the group of CORESETs associated with the PUCCH transmission can be based on a configuration provided by higher layers to the UE 116 from a serving gNB 102.

In some embodiments, the UE 116 can ignore TPC commands provided by DCI formats in PDCCH receptions from TRPs that use a different TCI state for corresponding CORESETs, or are associated with different groups of CORESETs, than the TCI state or the group of CORESETs for PDCCH receptions from a first TRP (CORESET group 0). When a TPC command value can be 0 dB, TPC command accumulation avoidance can be achieved by a respective TRP setting the TPC command value to 0. Then, the UE 116 may not expect to detect a DCI format indicating a different value for a TPC command field provided by a DCI format in a PDCCH reception in a second group of CORESETs.

In some embodiments, the UE 116 can determine to ignore TPC commands when an RS resource with a spatial setting that is suitable for the UE to determine a pathloss for the PUCCH transmission does not exist for the corresponding TRP. Another reason is that as the aforementioned TRP may not detect UCI in PUCCH transmissions from the UE, for example because the PUCCH transmissions may not be with an appropriate spatial setting for the TRP, the TRP may not have appropriate information for determining a PUCCH transmission power adjustment and corresponding TPC commands may have no purpose and be inaccurate as the UCI in the PUCCH is intended to be detected only by the first TRP. Moreover, a backhaul link among the TRPs may not have sufficiently small latency for the TRP of the PUCCH reception to indicate to other TRPs values for the TPC command field in DCI formats in PDCCH transmissions from the other TRPs.

In some embodiments, a serving gNB, such as the gNB 102, can provide the UE 116 configuration information for the TRPs or CORESETs that the UE 116 should not process TPC command values from DCI formats in corresponding PDCCH receptions for determining a PUCCH transmission power. For example, the gNB 102 can use two or more TRPs to detect UCI in a PUCCH reception, for example when such TRPs have a sufficiently small backhaul latency, and all TRPs can provide TPC commands in order to achieve a larger range of increased granularity for the TPC commands.

Figure 10:
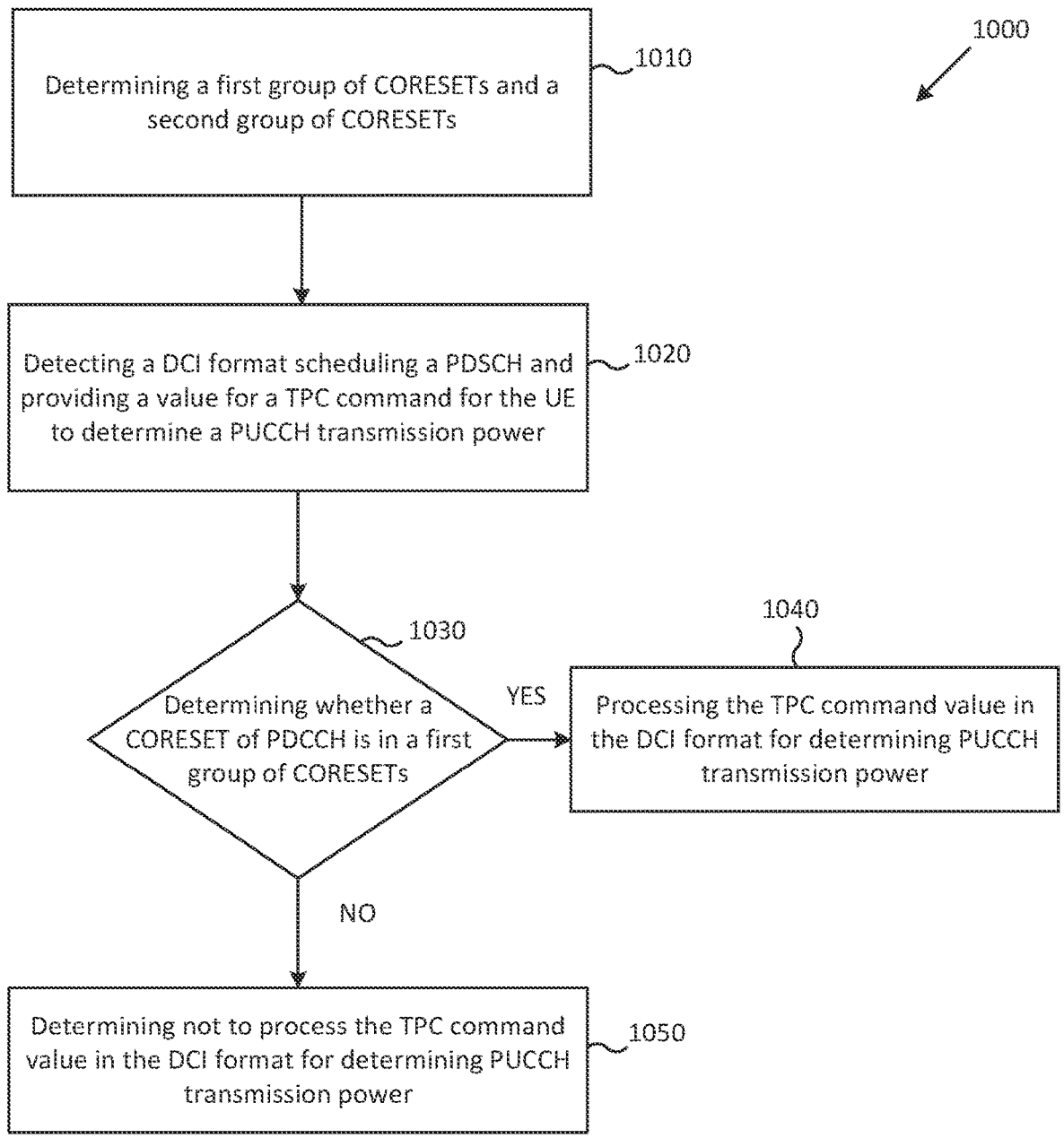
FIG. 10 illustrates a flowchart for a method of determining whether to process a value of a TPC command field in a DCI format for determining a power of a PUCCH transmission according to various embodiments of the present disclosure.

FIG. 10 illustrates a method of determining whether to process a value of a TPC command field in a DCI format for determining a power of a PUCCH transmission according to various embodiments of the present disclosure. Although described herein as being implemented by the UE 116, the method 1000 illustrated in FIG. 10 can be implemented by one or more of the UEs 111-116 and a corresponding method can be performed by one or more of the gNBs 101-103 described in FIG. 1. Other embodiments can be used without departing from the scope of the present disclosure.

In operation 1010, a UE, such as the UE 116, determines a first group of CORESETs and a second group of CORESETs. The first group of CORESETs is used for processing a value of a TPC command field provided by a DCI format in a PDCCH reception in a CORESET from the first group of CORESETs for determining PUCCH transmission power. The UE 116 does not use a TPC command value p by a DCI format in a PDCCH reception in a CORESET from the second group of CORESETs for determining the PUCCH transmission power. The DCI formats can schedule respective first and second PDSCH receptions by the UE, or a DCI format can indicate a SPS PDSCH release.

In operation 1020, the UE 116 detects a DCI format scheduling a PDSCH reception and providing a value for a TPC command for the UE 116 to determine a power for a PUCCH transmission. In operation 1030, the UE 116 determines whether the CORESET of the PDCCH reception providing the DCI format is from the first group of CORES ETs or from the second group of CORES ETs. If the UE 116 determines the CORESET of the PDCCH reception providing the DCI format s from the first group of CORESETs or from the second group of CORESETs, the UE 116 proceeds to operation 1040. If the UE 116 deter the CORESET of the PDCCH reception providing the DCI format is not from the first group of CORESETs or from the second group of CORESETs, the UE 116 proceeds to operation 1050.

In operation 1040, based on the UE 116 determining the CORESET of the PDCCH reception providing the DCII at is from the first group of CORESETs or from the second gr p of CORESETs, the UE 116 processes the value the TPC command field in the DO format determining a power for a PUCCH transmission. In operation 1050, based on the UE 116 determining the CORESET of the PDCCH reception providing the DCI format s not from the first group of CORESETs or the second group of CORESETs, the UE 116 determines not to process the value of the TPC command field in the DCI format for determining a power for a PUCCH transmission.

As described herein, the UE 116 can process a value of a TPC command field only from DCI formats in PDCCH receptions in CORESETs from the first group of CORESETs, where the DCI formats schedule PDSCH receptions or indicate an SPS PDSCH release. Similar to determining a power for a PUCCH transmission with corresponding HARQ-ACK information, the UE 116 can be configured by a serving gNB 102 to process a value of a PUCCH resource indicator field or a value of a PUCCH transmission timing field only from DCI formats in PDCCH receptions in CORESETs from the first group of CORESETs.

Various embodiments of the present disclosure enable the transmission of HARQ-ACK information by a UE when the UE is configured to communicate with multiple TRPs. PDSCH receptions with a same TB by the UE 116 from multiple TRPs can have several advantages. For example, when a high reception reliability is used for the TB as reception the TB from multiple TRPs can provide a larger signal-to-interference and noise ratio (SINR) and diversity to degradation in the channel medium or in interference conditions. In response to multiple PDSCH receptions of a same TB from multiple TRPs, the UE 116 does not always need to provide HARQ-ACK information for each TB reception. In one embodiment, when a backhaul communication latency among TRPs is practically non-zero, the UE 116 can separately provide HARQ-ACK information corresponding to the TB decoding outcome to each TRP that transmitted a corresponding PDSCH to the UE 116. This can be supported by the UE 116 transmitting a separate PUCCH with the HARQ-ACK information to each corresponding TRP.

In another embodiment, when a backhaul communication latency among TRPs is practically zero/insignificant, such as when the TRPs are collocated, the UE 116 may not separately provide HARQ-ACK information corresponding to the TB decoding outcome to each TRP that transmitted a corresponding PDSCH. As the backhaul latency among TRPs is practically zero, the UE 116 can multiplex HARQ-ACK information in a single PUCCH or PUSCH transmission to one of the TRPs, such as a primary TRP associated with a first group of CORESETs, or a TRP configured to the UE 116 by the serving gNB 102 by higher layers, and the remaining TRPs can be informed of the HARQ-ACK information through the backhaul link. The UE can identify the PUCCH or PUSCH transmission based on DCI formats scheduling PDSCH receptions or PUSCH transmissions that are received in PDCCHs in the first group of CORESETs. This can be beneficial to reduce a HARQ-ACK codebook size by avoiding duplicated HARQ-ACK information for a TB in a HARQ-ACK codebook.

Whether or not the UE 116 includes in a HARQ-ACK codebook HARQ-ACK information for a TB for each PDSCH reception of the TB can be configured by a serving gNB through higher layer signaling. A motivation can be that it may be beneficial for link adaptation of PDSCH transmissions from corresponding TRPs for the UE to provide HARQ-ACK information for a same TB decoding for each corresponding PDSCH reception. For example, when the UE 116 provides an ACK for a decoding of a TB in a PDSCH reception from a first TRP and a NACK for a decoding of the TB in a PDSCH reception from a second TRP, the first TRP may infer that the link adaptation for the TB transmission is adequate while the second TRP may infer that the link adaptation for the TB transmission is not adequate.

When the UE 116 provides a single HARQ-ACK information for TB decoding outcomes corresponding to multiple PDSCH receptions, the UE 116 generates an ACK value when one of the TB decoding outcomes is correct and generates a NACK value when all TB decoding outcomes are incorrect.

For a Type-1 HARQ-ACK codebook, the UE 116 can determine the HARQ-ACK codebook based on a union across TRPs of slot timing values $K_1$ associated with the active UL BWP. The UE 116 can also determine the HARQ-ACK codebook based on a union across TRPs of a set of row indexes R of a table that is provided by one of a first set of row indexes of a table that is provided by a higher layer parameter that includes a PDSCH time domain allocation list, a default PDSCH time domain resource allocation A, and a union of the first set of row indexes and a second set of row indexes associated with the active DL BWP and defining respective sets of slot offsets $K_0$, start and length indicators SLIV, and PDSCH mapping types for PDSCH reception. The UE 116 can also determine the HARQ-ACK codebook based on a ratio $2^{\mu_{DL}-\mu_{UL}}$ between the downlink SCS configuration $\mu_{DL}$ and the uplink SCS configuration $\mu_{UL}$ for the active DL BWP and the active UL BWP, respectively. Finally, the UE 116 can determine the HARQ-ACK codebook based on a union of UL-DL configurations for TRPs with flexible duplex operation.

For a Type-2 HARQ-ACK codebook, a counter DAI field, or a total DAI field, in DCI formats that schedule PDSCH receptions with a same TB can have a same value and a counter DAI value, or a total DAI value respectively, can be incremented in a DCI format scheduling a PDSCH reception of a new data TB.

For HARQ-ACK information multiplexing in a PUSCH transmission by the UE 116, an UL DAI field value in a corresponding DCI format can correspond to a number of TBs (including a SPS PDSCH release) that the UE 116 provides HARQ-ACK information for, instead of a number of DCI formats scheduling PDSCH receptions (or SPS PDSCH release) to the UE 116.

Figure 11:
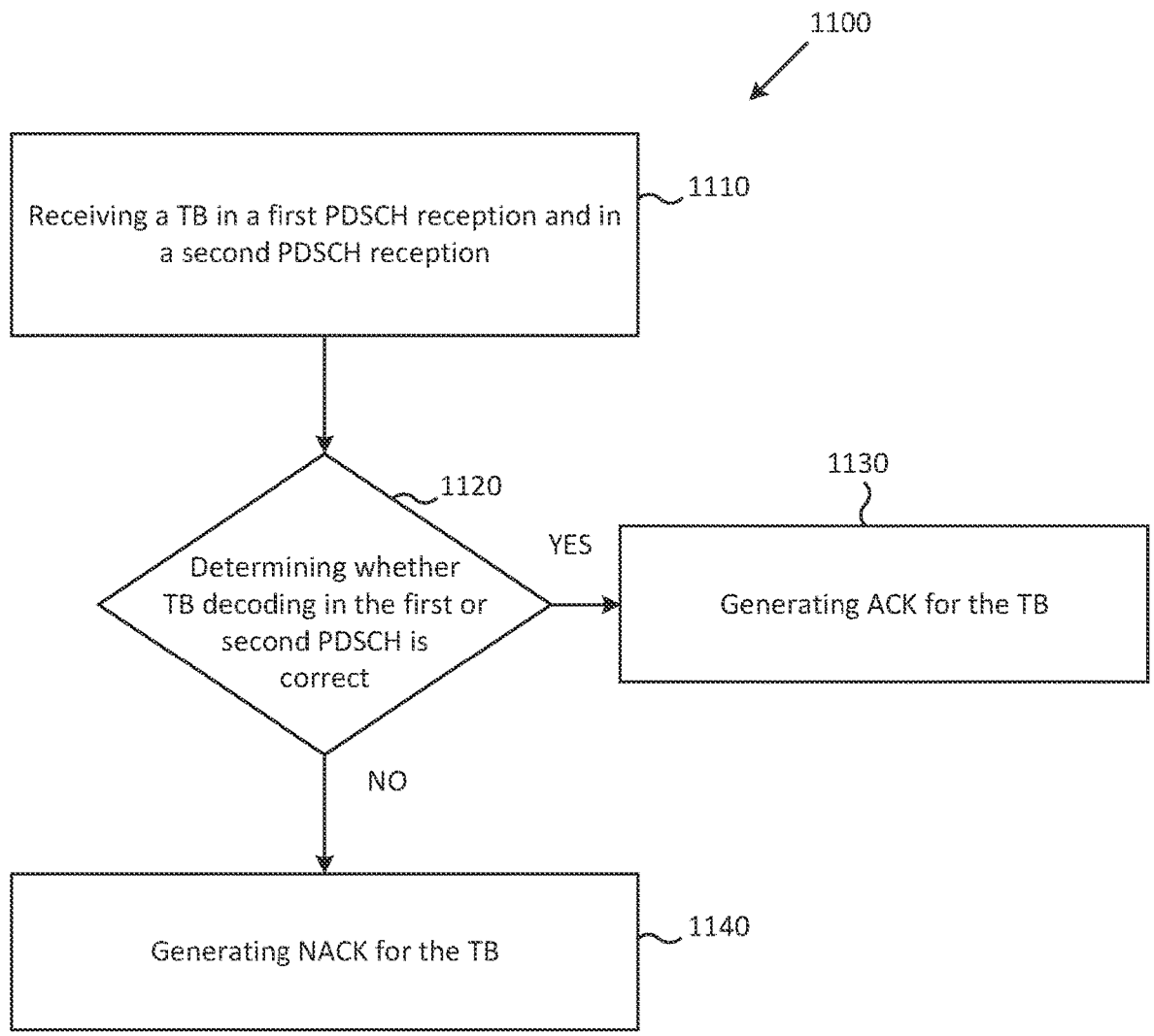
FIG. 11 illustrates a flowchart for a method of determining a HARQ-ACK codebook according to various embodiments of the present disclosure.

FIG. 11 illustrates a method of determining a HARQ-ACK codebook according to various embodiments of the present disclosure. More particularly, FIG. 11 illustrates a method of determining a HARQ-ACK codebook when the UE is configured for communication with multiple TRPs according to various embodiments of the present disclosure. Although described herein as being implemented by the UE 116, the method 1100 illustrated in FIG. 11 can be implemented by one or more of the UEs 111-116 and a corresponding method can be performed by one or more of the gNBs 101-103 described in FIG. 1. Other embodiments can be used without departing from the scope of the present disclosure.

In operation 1110, the UE 116 receives a same TB in a first PDSCH reception 1 in a second PDSCH reception. In other words, the same TB is received in both the first PDSCH and in the second PDSCH.

In operation 1120, the UE 116 determines whether a TB decoding in the first PDSCH reception or a TB decoding in the second PDSCH reception is correct. If the UE 116 determines a TB decoding in the first PDSCH reception or a TB decoding in the second PDSCH reception is correct, the UE 116 proceeds to operation 1130. If the UE 116 deter determines the TB decoding in the first PDSCH reception and the TB decoding in the second PDSCH reception is not correct, the UE 116 proceeds to operation 1140.

In operation 1130, based on the UE 116 determining the TB decoding in the first PDSCH reception the TB decoding in the second PDSCH reception is correct, the UE 116 generates a positive acknowledgement (ACK) for the TB. In operation 1140, based on the UE 116 determining the TB decoding in the first PDSCH reception and the TB decoding in the second PDSCH reception are not correct, the UE 116 generates a negative acknowledgement (HACK) for the TB.

In some embodiments, the UE 116 can combine demodulated symbols from multiple PDSCH receptions for a same TB prior to decoding (combining of log-likelihood metrics/ratios prior to decoding). The multiple PDSCH receptions can be from different TRPs. The UE 116 can perform a first decoding for the TB based on a first PDSCH reception and, when a second PDSCH reception for the TB is scheduled, the UE 116 can perform a second decoding for the TB using the combined demodulation symbols from the first PDSCH reception and the second PDSCH reception. The UE 116 can identify that the first and second PDSCH receptions include a same TB based on same values for a HARQ process number field and an NDI field in the DCI formats scheduling the two PDSCH receptions. The UE 116 can determine not to perform the second decoding for the TB, or to ignore an outcome of the second decoding for the TB, when the first decoding for the TB is correct. When the UE 116 is indicated to report in a same PUCCH a decoding outcome of the TB in the first PDSCH reception and a decoding outcome of the TB in the second PDSCH reception, the UE 116 reports an ACK if the decoding of the demodulated symbols for the TB from the first PDSCH reception or if the decoding of the combined demodulated symbols for the TB from the first and second PDSCH receptions is correct; otherwise, if the decoding of the demodulated symbols for the TB from the first PDSCH reception or if the decoding of the combined demodulated symbols for the TB from the first and second PDSCH receptions is not correct, the UE 116 reports a NACK.

In some embodiments, the UE 116 is configured for communication with a single TRP for the primary cell and for reporting of HARQ-ACK information using a Type-1 HARQ-ACK codebook, and the UE 116 reports HARQ-ACK information in a PUCCH only for one of a SPS PDSCH release indicated by DCI format 1_0 with counter DAI field value of 1 on the primary cell, a PDSCH reception scheduled by DCI format 1_0 with counter DAI field value of 1 on the primary cell, or SPS PDSCH reception, within the occasions for candidate PDSCH receptions that correspond to a HARQ-ACK information report using a Type-1 HARQ-ACK codebook. In these embodiments, the UE 116 determines a HARQ-ACK codebook only for the SPS PDSCH release or only for the PDSCH reception or only for the SPS PDSCH reception. This can be referred to as fallback HARQ-ACK information report.

In some embodiments, the UE 116 is configured for communication with multiple TRPs for the primary cell and to separately report HARQ-ACK information for per TRP. In these embodiments, the UE 116 applies a same procedure to determine a fallback HARQ-ACK information report per TRP as when the UE 116 is configured for communication with a single TRP for the primary.

In some embodiments, the UE is 116 configured for communication with multiple TRPs for the primary cell and to jointly report HARQ-ACK information for the multiple TRPs. In these embodiments, the UE 116 applies a same procedure for determining a fallback HARQ-ACK information report by considering PDSCH receptions or SPS PDSCH release reception across all TRPs. In particular, the UE 116 provides a fallback HARQ-ACK information report when a UE 116 is configured for communication with multiple TRPs for the primary cell and for reporting of HARQ-ACK information using a Type-1 HARQ-ACK codebook, and the UE 116 reports HARQ-ACK information in a PUCCH only for one of a SPS PDSCH release indicated by DCI format 1_0 with counter DAI field value of 1 by any one TRP on the primary cell, a PDSCH reception scheduled by DCI format 1_0 with counter DAI field value of 1 by any one TRP on the primary cell, or SPS PDSCH reception by any one TRP, within the occasions for candidate PDSCH receptions that correspond to a HARQ-ACK information report using a Type-1 HARQ-ACK codebook, the UE 116 determines a HARQ-ACK codebook only for the SPS PDSCH release or only for the PDSCH reception or only for the SPS PDSCH reception.

In some embodiments, the UE 116 is configured to multiplex UCI for PDSCH receptions from a first TRP (corresponding PDCCH receptions in a first CORESET group) in a first PUCCH transmission and to multiplex UCI for PDSCH receptions from a second TRP (corresponding PDCCH receptions in a second CORESET group) in a second PUCCH transmission then, at least when the two PUCCH transmissions can have different spatial settings, and the UE 116 does not simultaneously transmit the two PUCCHs. In these embodiments, the UE 116 drops transmission for one of the PUCCHs.

The UE 116 may not expect to be configured with PUCCH resources for periodic or semi-persistent PUCCH transmissions to different TRPs (PUCCH transmissions associated with different CORESET groups) that overlap in time. For a first PUCCH transmission to a first TRP that is in response to a DCI format detection in a PDCCH received in a first group of CORESETs, a collision (time overlapping transmission with different spatial settings) with a second PUCCH transmission to a second TRP can occur due to several reasons. For example, the first PUCCH transmission can include HARQ-ACK information for a service that uses low latency and it may not be possible for the scheduler to postpone or shorten the first PUCCH transmission so that it does not overlap with the second PUCCH transmission. For example, both the first and second PUCCH transmissions can include HARQ-ACK information and a collision can occur when some PUCCH resources for PUCCH transmission to the two TRPs overlap in time and the UE 116 is indicated PUCCH resources that overlap in time for the PUCCH transmission.

In other embodiments, when such a collision occurs, the ongoing/earlier PUCCH transmission can be prioritized. This can avoid partially discontinuous PUCCH transmissions that may be hard to detect by a TRP but does not account for the priority of UCI types in each PUCCH transmission.

In other embodiments, when a difference between a first time the UE 116 detects a DCI format indicating the first PUCCH transmission (end of last symbol of PDCCH providing the DCI format), such as one with HARQ-ACK information, to the first TRP and a second time for the start of the second PUCCH transmission (start of first symbol for the second PUCCH transmission), for example with CSI, to the second TRP is smaller than a predetermined value, the UE 116 can transmit the second PUCCH and drop transmission of the first PUCCH. Alternatively, the UE 116 can transmit the second PUCCH until a third time when the difference between the time the UE 116 detects a DCI format and the third time is larger than or equal to the predetermined value. Then, the UE 116 has enough processing time to drop the remaining second PUCCH transmission and transmit the remaining first PUCCH transmission. When a difference between a first time the UE 116 detects a DCI format (end of last symbol of corresponding PDCCH) indicating the first PUCCH transmission to the first TRP and a second time for the start of a second PUCCH transmission (start of first symbol of second PUCCH transmission) to the second TRP is larger than or equal to the predetermined value, the UE 116 can transmit the first PUCCH and drop transmission of the second PUCCH. The UE 116 can determine the PUCCH to transmit, and consequently the PUCCH transmissions to drop, based on a UCI type the UE 116 would multiplex.

A PUCCH with HARQ-ACK information can have higher priority for transmission than a PUCCH with SR and a PUCCH with CSI can have the lowest priority. When multiple PUCCH transmissions to respective multiple TRPs include UCI of same highest priority, the UE 116 can prioritize a PUCCH transmission to a TRP having the lower index (CORESET group 0), such as a primary TRP, among the multiple TRPs.

To minimize time overlapping PUCCH transmissions with different spatial settings associated with different CORESET group indexes, TRPs can exchange over a backhaul link the PUCCH resources configured to the UE 116 for PUCCH transmissions to the TRPs. This can include whether or not the PUCCH resources are for periodic/semi-persistent PUCCH transmissions. Alternatively, a primary TRP can signal over the backhaul link the PUCCH resources to remaining, or secondary, TRPs for the remaining TRPs to use for PUCCH receptions.

In some embodiments, time overlapping transmissions with different spatial settings, or collisions, can occur among other signals/channels such as PUSCH, PRACH, and SRS. PUSCH collisions with other signals/channels, including PUSCH, can be difficult for a network to avoid. For example, always precluding time resources configured for transmissions to a second TRP from time resources available for a PUSCH transmission to a first TRP can create material constraints in scheduling flexibility, result to spectral efficiency or throughput loss when the time resources are not used for PUSCH transmission, and fail to satisfy latency requirements for transmission of TBs associated with applications using low latency. Similarly, PRACH or SRS collisions with other channels/signals may not be possible to avoid, particularly for flexible duplex operation where time resources for transmissions from the UE 116 can be limited.

In various embodiments, for time overlapped transmissions with different spatial settings to different TRPs, the UE 116 can prioritize transmissions in the following descending order:

PRACH transmission on a primary TRP has the highest priority order as it can be related to maintaining a communication link.

PUCCH transmission with HARQ-ACK information and/or SR or PUSCH transmission with HARQ-ACK information. For multiple such transmissions, the UE 116 transmits the one to the TRP with the lowest index, such as the primary TRP, associated with CORESET group 0.

PUCCH transmission with CSI or PUSCH transmission with CSI. For multiple such transmissions, the UE 116 transmits the one to the TRP with the lowest index, such as the primary TRP, associated with CORESET group 0. Also, PUSCH transmission with CSI can have higher priority than PUCCH transmission with CSI.

PUSCH transmission without HARQ-ACK information or CSI. For multiple such transmissions, the UE 116 transmits the one to the TRP with the lowest index, such as the primary TRP, associated with CORESET group 0.

SRS transmission, with aperiodic SRS having higher priority than semi-persistent and/or periodic SRS. For multiple such transmissions, the UE 116 transmits the one to the TRP with the lowest index such as the primary TRP. SRS transmissions to the primary TRP can be prioritized over PUSCH transmissions without UCI to another TRP.

PRACH transmission on a TRP other than the primary TRP. For multiple such transmissions, the UE 116 transmits the one to the TRP with the lowest index.

As described herein, various embodiments of the present disclosure control signaling for communication with multiple transmission reception points. Due to high growth in mobile data traffic and the support of new applications and deployments, radio interface efficiency and coverage must continue to be improved.

When a UE detects a DCI format scheduling a PDSCH reception, the UE processes values of a counter DAI field, or a total DAI field, of a PUCCH resource indicator (PRI) field and of HARQ-ACK timing indicator field according to a HARQ-ACK codebook that the UE multiplexes HARQ-ACK information for the PDSCH reception in a PUCCH. The HARQ-ACK timing indicator field can be referred to as PDSCH-to-HARQ_feedback timing indicator field. Further, when the UE is configured for operation with carrier aggregation (CA) over a set of cells that includes cells where the UE is configured to receive PDCCH scheduling PDSCH from multiple TRPs per cell (multiple CORESET groups) and cells where the UE is configured to receive PDCCH scheduling PDSCH only from a single TRP per cell, the cells are arranged in cell groups according to respective CORESET group indexes where the UE provides HARQ-ACK information for PDSCH receptions on each cell of the cell group in a same HARQ-ACK codebook. For example, cells that include CORESETs for CORESET group 0 or cells that include CORESETs without a configuration for a CORESET group are in a first group of cells and cells that include CORESETs for CORESET group 1 are in a second group of cells. Additionally, when the UE multiplexes several UCI types that include HARQ-ACK information associated with PDCCH receptions in a first group of CORESETs in a PUCCH transmission with a first spatial setting to a first TRP, a PUCCH resource that the UE determines for multiplexing the UCI types can overlap in time with a PUCCH resource for a PUCCH transmission with a second spatial setting to a second TRP. Such overlapping can occur even when a PUCCH resource for multiplexing only the HARQ-ACK information in a PUCCH transmission to the first TRP does not overlap in time with the PUCCH resource for the PUCCH transmission to the second TRP because a final PUCCH resource for multiplexing the several UCI types can be different than the PUCCH resource for multiplexing only HARQ-ACK information.

Accordingly, various embodiments of the present disclosure recognize and consider the need for a UE, that is configured for PDSCH receptions from multiple TRPs, to determine how to process a counter DAI field, a total DAI field, a PRI field, and a HARQ-ACK timing indicator field in a DCI format that schedules a PDSCH reception from one TRP (UE receives corresponding PDCCH in a CORESET from a group of CORESETs). Various embodiments of the present disclosure further recognize and consider the need for a UE, that is configured for CA operation, to determine a HARQ-ACK codebook when the UE is also configured to receive PDSCH from one TRP on a first subset of cells and is configured to receive PDSCH from more than one TRPs on a second subset of cells.

In addition, various embodiments of the present disclosure recognize and consider the need for a UE to determine transmissions when the UE would transmit using different spatial settings to more than one TRPs in time overlapping resources. Further, various embodiments of the present disclosure recognize and consider the need for a UE to avoid transmissions with different spatial setting to more than one TRPs in time overlapping resources.

As described herein, various embodiments of the present disclosure provide processing of DAI and PUCCH resource allocation fields in DCI formats. In some embodiments, for a Type-2/dynamic HARQ-ACK codebook, a value of a counter DAI field and a value of a total DAI field, in DCI formats that schedule PDSCH receptions with different TBs from different TRPs can be jointly or separately counted depending on an explicit or implicit configuration by higher layers.

For example, a counter DAI value and a total DAI value can separately count DCI formats that schedule PDSCH receptions from two TRPs when a backhaul latency between the two TRPs is large enough for respective schedulers at the two TRPs to not be able to jointly set/coordinate the counter DAI value and the total DAI value. Conversely, a counter DAI value and a total DAI value can jointly count DCI formats that schedule PDSCH receptions by a UE from the two TRPs when a backhaul latency between the two TRPs is small enough for respective schedulers at the two TRPs to be able to jointly set/coordinate the counter DAI and the total DAI values. In embodiments where a UE provides HARQ-ACK information for 2 PDSCH receptions from 2 TRPs in a PUCCH transmission, a scheduler at a first TRP can set a counter DAI value to 1 in a DCI format scheduling a PDSCH reception by the UE from the first TRP, a scheduler at a second TRP can set a counter DAI value to 2 in a DCI format scheduling a PDSCH reception by the UE from the second TRP, and both schedulers can set a total DAI value to 2.

A gNB, such as the gNB 102, can provide to a UE, such as the UE 116, a higher layer parameter DAI_setting that indicates whether a counter DAI value and a total DAI value are counted jointly across TRPs or are counted separately per TRP. Alternatively, a determination of whether a counter DAI value and a total DAI value are counted jointly across TRPs or are counted separately per TRP can be associated with a configuration to the UE 116 to jointly or separately provide HARQ-ACK information for PDSCH receptions from each TRP. When the UE 116 is configured to jointly provide HARQ-ACK information for PDSCH receptions from each TRP in a same HARQ-ACK codebook that is multiplexed in a PUCCH transmission or a PUSCH transmission, the UE 116 can determine that a value of a counter DAI field in a DCI format jointly counts PDSCH transmissions from both TRPs. The two TRPs can then be viewed as two virtual cells that belong to a same cell group.

Figure 12:
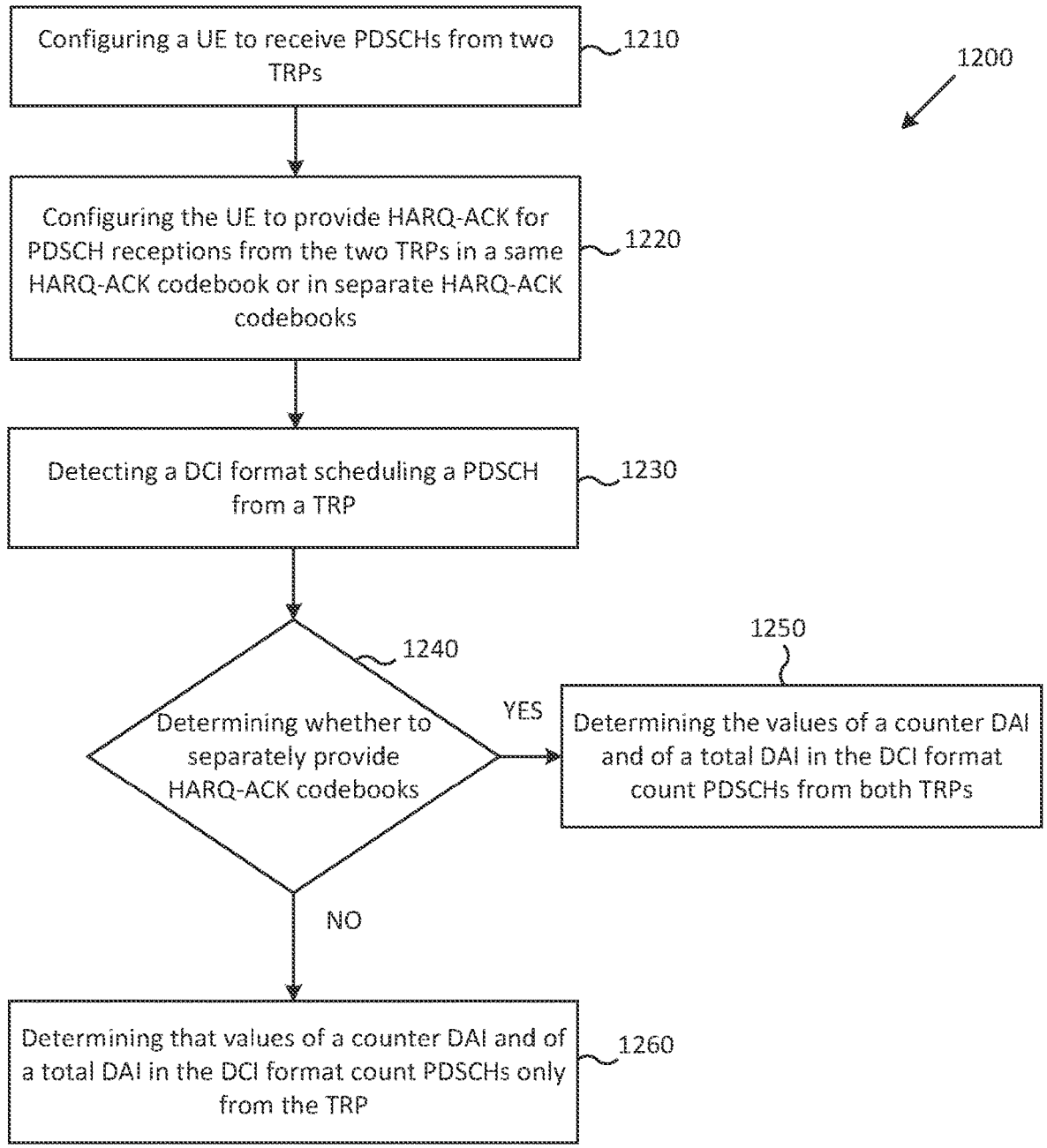
FIG. 12 illustrates a flowchart for a method of determining whether a counter DAI value and a total DAI value indicate a number of PDSCH transmissions from only the first TRP or from both TRPs according to various embodiments of the present disclosure.

FIG. 12 illustrates a method of determining whether a counter DAI value and a total DAI value indicate a number of PDSCH transmissions from only the first TRP or from both TRPs according to various embodiments of the present disclosure. More particularly, FIG. 12 illustrates a method, performed by a UE configured for PDSCH receptions from two TRPs, of determining whether a counter DAI value and a total DAI value of a DCI format in a PDCCH reception from a first TRP indicate a number of PDSCH transmissions from only the first TRP or from both TRPs according to various embodiments of the present disclosure. Although described herein as being implemented by the UE 116, the method 1200 illustrated in FIG. 12 can be implemented by one or more of the UEs 111-116 and a corresponding method can be performed by one or more of the gNBs 101-103 described in FIG. 1. Other embodiments can be used without departing from the scope of the present disclosure.

In operation 1210, a UE, such as the UE 116, is configured to receive PDSCHs from two TRPs (scheduled by DCI formats in PDCCH receptions in two respective CORESET groups). The UE 116 can be configured by higher layer signaling or the configuration can be stored in the memory 360.

In operation 1220, the UE 116 is configured to provide HARQ-ACK information for PDSCH receptions from the two TRPs either in a same HARQ-ACK codebook or in separate HARQ-ACK codebooks. The UE 116 can be configured by higher layer signaling or the configuration can be stored in the memory 360.

In operation 1230, the UE 116 detects a DCI format scheduling a PDSCH reception from a TRP of the two TRPs (from a PDCCH reception in a CORESET of one CORESET group). In operation 1240, the UE 116 determines whether to separately provide HARQ-ACK codebooks for PDSCH receptions from each of the two TRPs. If the UE 116 determines to separately provide the HARQ-ACK codebooks, the UE 116 proceeds to operation 1250. If the UE 116 determines to jointly provide the HARQ-ACK codebooks, the UE 116 proceeds to operation 1260.

In operation 1250, based on the UE 116 determining to separately provide HARQ-ACK codebooks for PDSCH receptions from each of the two TRPs in operation 1240, the UE 116 determines that values of a counter DAI and of a total DAI in the DCI format count PDSCH receptions from each TRP. In operation 1260, based on the UE 116 determining to jointly provide HARQ-ACK codebooks for PDSCH receptions from each of the two TRPs in operation 1240, the UE 116 determines that values of a counter DAI and of a total DAI in the DCI format count PDSCH receptions from both TRPs.

In some embodiments, the UE 116 can be configured to separately provide HARQ-ACK information for PDSCH receptions from each TRP in different HARQ-ACK codebooks that are multiplexed in different respective PUCCH transmissions or PUSCH transmissions. In these embodiments, the UE 116 can determine that a value of a counter DAI field in a DCI format separately counts PDSCH transmissions from each TRP. The two TRPs can then be viewed as two virtual cells that belong to respective two different cell groups. A cell having two TRPs where a counter DAI value and a total DAI value are separately counted per TRP can be considered to include two virtual cells wherein each virtual cell belongs to a different cell group.

In some embodiments, the UE 116 can generate a single HARQ-ACK codebook in response to PDSCH receptions from multiple TRPs. In these embodiments, the UE 116 can be provided with a single configuration for PUCCH resources for a PUCCH transmission with the HARQ-ACK codebook. A PUCCH resource indicator (PRI) field in DCI formats scheduling PDSCH receptions from the multiple TRPs indicates a resource in a same set of PUCCH resources and a last PDCCH reception where the UE 116 detects a DCI format scheduling a PDSCH reception that the UE 116 provides HARQ-ACK information in a same HARQ-ACK codebook can be from any of the multiple TRPs.

In some embodiments, the UE 116 can be configured to generate separate HARQ-ACK codebooks in response to PDSCH receptions from different TRPs. In these embodiments, the UE 116 can be provided with respective separate configurations for PUCCH resources for transmitting respective separate PUCCHs with the separate HARQ-ACK codebooks. A PRI field in DCI formats scheduling PDSCH receptions from the multiple TRPs indicates a resource in the respective separate sets of PUCCH resources and a last PDCCH reception where the UE 116 detects a DCI format scheduling a PDSCH reception that the UE 116 provides HARQ-ACK information in a same HARQ-ACK codebook can be only from TRPs/cells that the UE 116 is configured to provide HARQ-ACK information in a same HARQ-ACK codebook. In addition, a HARQ-ACK timing resource indicator in DCI formats scheduling PDSCH receptions from the multiple TRPs can indicate a slot for a PUCCH transmission with HARQ-ACK information and a last PDCCH reception where the UE 116 detects a DCI format scheduling a PDSCH reception that the UE 116 provides HARQ-ACK information in a same HARQ-ACK codebook can be only from TRPs/cells that the UE 116 is configured to provide HARQ-ACK information in a same HARQ-ACK codebook.

In some embodiments, operations with carrier aggregation (CA) can include cells with one TRP and cells with more than one TRPs, such as two TRPs. Cells with two TRPs can be considered as including two virtual cells, each corresponding to each of the two TRPs. A first cell group can include the first virtual cell corresponding to the first TRP (first CORESET group) and a second cell group can include the second virtual cell corresponding to the second TRP (second CORESET group).

In embodiments where the UE 116 generates separate HARQ-ACK codebooks for the two TRPs, HARQ-ACK information for PDSCH receptions on a first cell that has a single TRP can be configured to be associated with the HARQ-ACK codebook associated either with the first TRP (first cell group) or with the second TRP (second cell group). HARQ-ACK information for PDSCH receptions on a first cell that does not have a configuration for a CORESET group can be multiplexed in a HARQ-ACK codebook associated with a cell group corresponding to a default TRP such as the TRP with the lowest index (first TRP or first virtual cell). Similar, for processing a counter DAI field value and a total DAI field value in a DCI format scheduling PDSCH receptions on a cell with a single TRP, the UE 116 can be configured with a cell group for the cell or the UE 116 can include the cell in a same cell group as for the first TRP by default (when no configuration is provided) and use counter DAI values and total DAI values in DCI formats scheduling PDSCH transmissions on the cell and on the virtual cell for the first TRP for determining a same HARQ-ACK codebook. This can be referred to as joint processing of the counter DAI and of the total DAI values.

Figure 13:
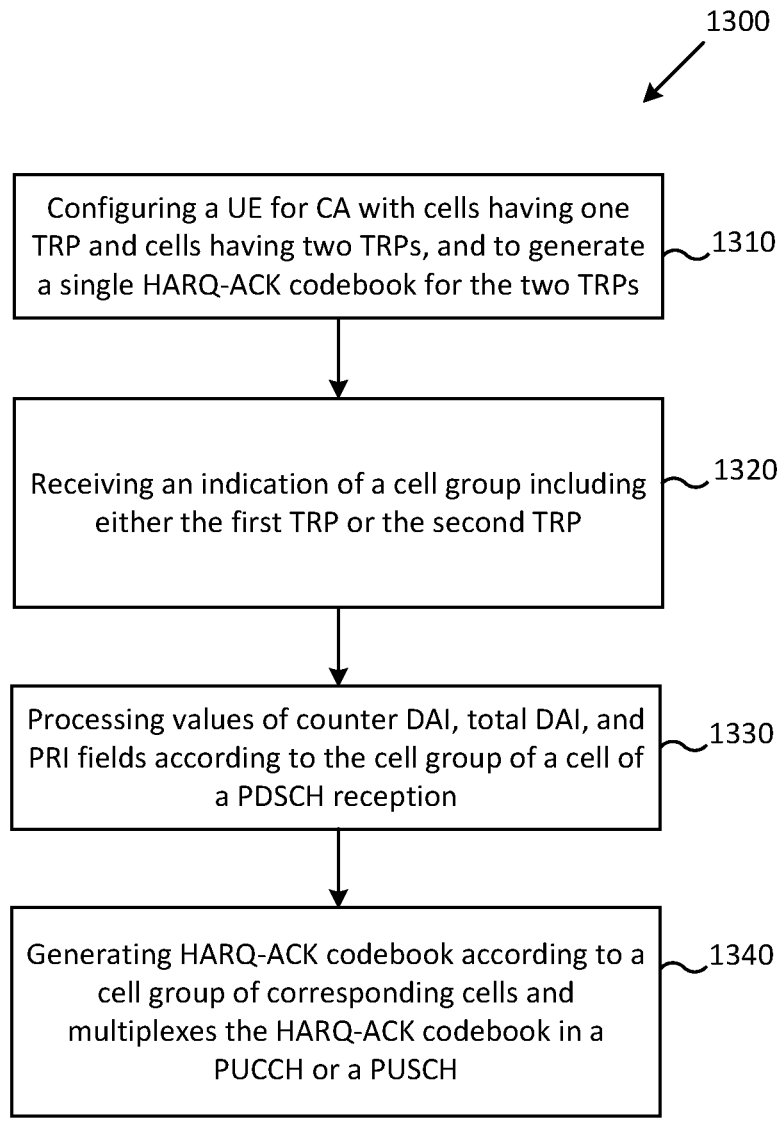
FIG. 13 illustrates a flowchart for a method for determining a HARQ-ACK codebook according to various embodiments of the present disclosure.

FIG. 13 illustrates a method for determining a HARQ-ACK codebook according to various embodiments of the present disclosure. More particularly, FIG. 13 illustrates a method, performed by a UE that is configured for CA operation with one or more cells that include one TRP and with one or more cells that include two TRPs, of determining a HARQ-ACK codebook according to various embodiments of the present disclosure. Although described herein as being implemented by the UE 116, the method 1300 illustrated in FIG. 13 can be implemented by one or more of the UEs 111-116 and a corresponding method can be performed by one or more of the gNBs 101-103 described in FIG. 1. Other embodiments can be used without departing from the scope of the present disclosure.

In operation 1310, a UE, such as the UE 116, is configured for CA operation with one or more cells that include one TRP (one CORESET group with index 0 or no CORESET group for a first TRP, or one CORESET group with index 1 for a second TRP) and with one or more cells that include two TRPs (two CORESET groups) and the UE 116 is configured to generate a single HARQ-ACK codebook for the two TRPs. The UE 116 can be configured by higher layer signaling or the configuration can be stored in the memory 360. The TRP includes an index that can be explicitly configured to the UE 116 or is implicitly determined by the UE 116, for example through an index of a CORESET for PDCCH receptions from the TRP. For example, the TRP with PDCCH transmissions in a CORESET with the smallest index (index 0), among the CORESETs configured to the UE 116 for PDCCH receptions such as in the cell with the smallest index that includes two TRPs is the first of the two TRPs.

In operation 1320, for a cell that includes one TRP, the UE 116 receives an indication, by higher layers, of a cell group that includes either the first TRP or the second TRP. In some embodiments, the cell group for a single TRP can be, by default when no configuration provided by higher layers, the cell group for the first TRP.

In operation 1330, for each generation of a HARQ-ACK codebook, the UE 116 processes values of a counter DAI field, a total DAI filed, and a PRI field value according to the cell group (CORESET group) of a cell of a PDSCH reception. In particular, the UE 116 processes values of a counter DAI field and of a total DAI field, in a DCI format scheduling a PDSCH reception on the cell, jointly with values of a counter DAI field and of a total DAI field in a DCI format scheduling a PDSCH reception on any cell in a same cell group (CORESET group). The UE 116 processes the PRI field value in a DCI format scheduling a PDSCH reception on a cell according to the cell group that the cell belongs to. As described herein regarding HARQ-ACK codebook generation, a cell with two TRPs can include two cells wherein a first cell is associated with a first cell group (first CORESET group) and a second cell is associated with a second cell group (second CORESET group).

In operation 1340, the UE 116 generates a HARQ-ACK codebook for PDSCH receptions according to a cell group (CORESET group) of corresponding cells and multiplexes the HARQ-ACK codebook in a PUCCH transmission or in a PUSCH transmission.

As described herein, various embodiments of the present disclosure provide conditions for the resolution of collisions of PUCCH transmissions or of PUCCH and PUSCH transmissions.

In some embodiments, a UE, such as the UE 116, can transmit a first PUCCH, for example with HARQ-ACK information, using a first PUCCH resource and transmit a second PUCCH, for example with CSI, in a second PUCCH resource and the first and second PUCCH resources overlap in time. In these embodiments, the UE 116 can determine a third PUCCH resource to multiplex the combined UCI in a PUCCH transmission when certain timeline conditions for the multiplexing of the combined UCI are satisfied. When the UE 116 is configured to multiplex first HARQ-ACK information for PDSCH receptions on cells of a first cell group associated with a first TRP (first CORESET group) in a first PUCCH transmission over a first PUCCH resource and to multiplex second HARQ-ACK information for PDSCH receptions on cells of a second cell group associated with a second TRP (second CORESET group) in a second PUCCH transmission over a second PUCCH resource, the UE 116 can expect that the first and second PUCCH resources do not overlap in time.

When the UE 116 multiplexes CSI and/or SR with the first HARQ-ACK information, a PUCCH resource that the UE 116 determines for multiplexing the combined UCI in a PUCCH transmission in a slot may overlap in time with a PUCCH resource that the UE 116 uses to transmit a PUCCH with the second HARQ-ACK information in the slot. The PUCCH can further be transmitted with one or both of the CSI or SR in the slot. In some embodiments, the UE 116 does not expect such overlapping to occur. When the overlapping does occur, the UE 116 behavior can remain undefined.

In some embodiments, the UE 116 can be configured, or specified in the system operation, to not multiplex CSI or SR with the first HARQ-ACK information when a resulting PUCCH resource would overlap in time with a PUCCH resource for a PUCCH transmission with the second HARQ-ACK information. Otherwise, when the UE 116 is configured to multiplex CSI or SR with the first HARQ-ACK information when a resulting PUCCH resource would overlap in time with a PUCCH resource for a PUCCH transmission with the second HARQ-ACK information, the UE 116 can drop the PUCCH transmission with the second HARQ-ACK information.

In some embodiments, the UE 116 can be configured to determine a PUCCH resource for multiplexing CSI or SR with the first HARQ-ACK information that does not overlap with a PUCCH resource for a PUCCH transmission with the second HARQ-ACK information. For example, when the UE 116 determines a first PUCCH resource for multiplexing CSI or SR with the first HARQ-ACK information and the first PUCCH resource overlaps with a PUCCH resource for a PUCCH transmission with the second HARQ-ACK information, the UE 116 can determine a next PUCCH resource that satisfies the conditions for multiplexing CSI or SR with the first HARQ-ACK information, such as satisfying timeline conditions and resulting to a next smaller code rate for the combined UCI relative to the code rate of the first PUCCH resource. When no such PUCCH resource exists, the UE 116 can drop the CSI or SR and multiplex only the first HARQ-ACK information in a PUCCH transmission over a resource that does not overlap with a PUCCH resource for a PUCCH transmission with the second HARQ-ACK information.

The embodiments described herein can be extended when the first CSI or SR is multiplexed with first HARQ-ACK information in a first PUCCH and second CSI or SR is multiplexed with second HARQ-ACK information in a second PUCCH. For example, when the UE 116 behavior remains undefined, the UE 116 can expect that any PUCCH resource determined for the first PUCCH with first CSI and/or SR and/or HARQ-ACK information does not overlap with any PUCCH resource determined for the second PUCCH with second CSI and/or SR and/or HARQ-ACK information.

As another example, when the UE 116 is configured to not multiplex CSI or SR with the first HARQ-ACK information when a resulting PUCCH resource would overlap in time with a PUCCH resource, the UE 116 can determine a third PUCCH resource for a first PUCCH transmission with first HARQ-ACK information and/or SR and/or CSI and a fourth PUCCH resource for a second PUCCH transmission with second HARQ-ACK information and/or SR and/or CSI. When the third PUCCH resource and the fourth PUCCH resource overlap in time, the UE 116 determines whether or not the third PUCCH resource overlaps in time with a second PUCCH resource for the second PUCCH transmission with only second HARQ-ACK information. When the third PUCCH resource does not overlap in time with the second PUCCH resource, the UE 116 transmits the first PUCCH with first HARQ-ACK information and/or SR and/or CSI in the third PUCCH resource and the second PUCCH with only second HARQ-ACK information in the second PUCCH resource. When the third PUCCH resource overlaps in time with the second PUCCH resource, the UE 116 transmits the first PUCCH with only first HARQ-ACK information in the first PUCCH resource and the second PUCCH with only second HARQ-ACK information in the second PUCCH resource.

Figure 14:
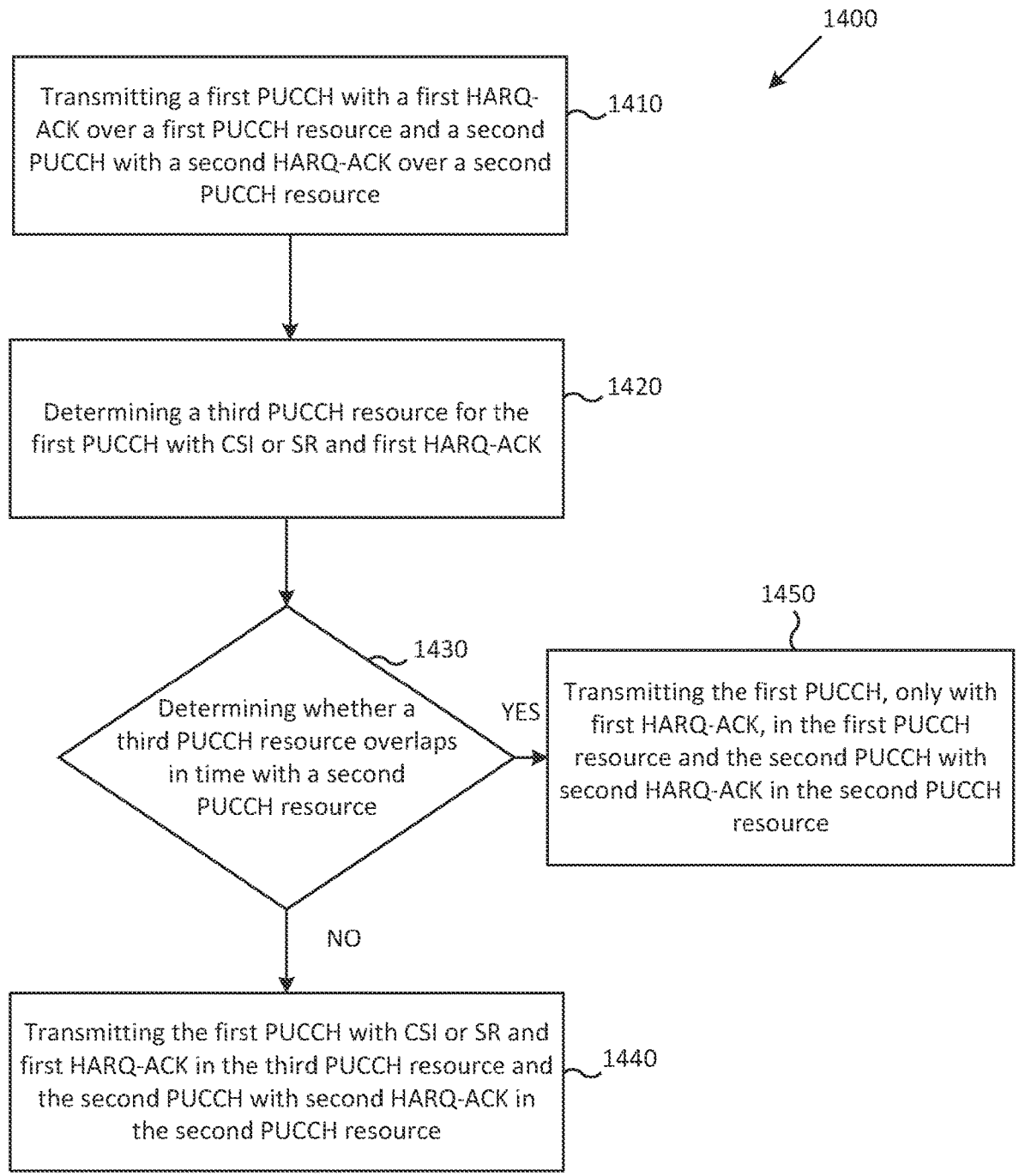
FIG. 14 illustrates a flowchart for a method of determining whether to multiplex CSI or SR with first HARQ-ACK information according to various embodiments of the present disclosure.

FIG. 14 illustrates a method of determining whether to multiplex CSI or SR with first HARQ-ACK information according to various embodiments of the present disclosure. More particularly, FIG. 14 illustrates a method of determining whether to multiplex CSI or SR with first HARQ-ACK information depending on whether a resulting PUCCH resource for a PUCCH transmission overlaps in time with a PUCCH resource for a PUCCH transmission with second HARQ-ACK information according to various embodiments of the present disclosure. Although described herein as being implemented by the UE 116, the method 1400 illustrated in FIG. 14 can be implemented by one or more of the UEs 111-116 and a corresponding method can be performed by one or more of the gNBs 101-103 described in FIG. 1. Other embodiments can be used without departing from the scope of the present disclosure.

In operation 1410, a UE, such as the UE 116, transmits a first PUCCH with first HARQ-ACK information over a first PUCCH resource and a second PUCCH with second HARQ-ACK information over a second PUCCH resource.

In operation 1420, the UE 116 determines a third PUCCH resource for the first PUCCH where the UE 116 multiplexes CSI or SR with the first HARQ-ACK information. In operation 1430, the UE 116 determines whether the third PUCCH resource determined in operation 1420 overlaps in time with the second PUCCH resource. If the UE 116 determines the third PUCCH resource does not overlap in time with the second PUCCH resource, the UE 116 proceeds to operation 1440. If the UE 116 determines the third PUCCH resource overlaps in time with the second PUCCH resource, the UE 116 proceeds to operation 1450.

In operation 1440, based on the UE 116 determining the third PUCCH resource does not overlap in time with the second PUCCH resource in operation 1430, the UE 116 transmits the first PUCCH with the first HARQ-ACK information and CSI or SR in the third PUCCH resource and the second PUCCH with the second HARQ-ACK information in the second PUCCH resource. In operation 1450, based on the UE 116 determining the third PUCCH resource overlaps in time with the second PUCCH resource operation 1430, the UE 116 transmits the first PUCCH only with the first HARQ-ACK information in the first PUCCH resource and the second PUCCH with the second HARQ-ACK information in the second PUCCH resource.

In some embodiments, such as due to a backhaul latency, multiple TRPs on a cell can perform uncoordinated scheduling of PDSCH receptions by the UE 116 or of PUSCH transmissions from the UE 116. In these embodiments, a PUSCH transmission from the UE 116 to a first TRP on the cell overlaps in time with a PUCCH transmission, such as one with HARQ-ACK information, to a second TRP on the cell. When the UE 116 is configured to multiplex first HARQ-ACK information in response to PDSCH receptions from the first TRP and second HARQ-ACK information in response to PDSCH receptions from the second TRP in respective separate first and second HARQ-ACK codebooks, the UE 116 may not multiplex the second HARQ-ACK information in the PUSCH transmission to the first TRP.

For example, the UE 116 can determine whether to drop the PUSCH transmission to the first TRP or the PUCCH transmission to the second TRP based on the contents of the PUSCH transmission. When the PUSCH transmission includes HARQ-ACK information to the first TRP or includes MAC control elements (CEs) such as a buffer status report or a power headroom report, the UE 116 drops the PUCCH transmission to the second TRP and transmits the PUSCH to the first TRP. Otherwise, the UE 116 drops the PUSCH transmission to the first TRP and transmits the PUCCH to the second TRP.

As another example, the UE 116 can be configured with different cells for PUCCH transmission to the first TRP and for PUCCH transmission to the second TRP, when the UE 116 has a capability to simultaneously transmit two PUCCHs on different cells. When the UE 116 needs to transmit a PUSCH and a PUCCH in time overlapping resources and on a same cell, the UE 116 transmits the PUCCH and does not transmit the PUSCH.

As another example, to avoid time domain overlapping of PUSCH and PUCCH transmissions from the UE 116 to different TRPs of a cell, a TRP of the cell is restricted to schedule PUSCH transmissions from the UE 116 only in resources that do not overlap with any of the PUCCH resources configured for PUCCH transmissions from the UE to another TRP of the cell. TRPs can be informed over a backhaul link of the PUCCH resources allocated to other TRPs, for example when the UE 116 is configured to provide separate HARQ-ACK codebooks in separate PUCCH or PUSCH transmissions for the TRPs.

In some embodiments, a PUCCH or PUSCH transmission to a first TRP can apply a first spatial setting and a PUCCH or PUSCH transmission to a second TRP can apply a second spatial setting, which is different from the first spatial setting. In these embodiments, the PUCCH or PUSCH transmission to the first TRP can be considered to overlap in time with the PUCCH or PUSCH transmission to the second TRP when a time difference between the two transmissions to the first TRP and the second TRP is smaller than a time required by the UE 116 to switch a spatial setting from the first spatial setting to the second spatial setting, or vice versa. The UE 116 can indicate to a serving gNB, such as the gNB 102, the time the UE 116 requires to switch a spatial setting through a corresponding UE capability parameter or that time can be predetermined in the system operation and may depend on the SCS configuration for the PUCCH transmission.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive:
a configuration for first control resource sets (CORESETs) and second CORESETs,
physical downlink control channels (PDCCHs) in the first or second CORESETs, wherein the PDCCHs provide respective downlink control information (DCI) formats scheduling respective receptions of physical downlink shared channels (PDSCHs), and
the PDSCHs corresponding to the PDCCHs; and
a processor operably coupled to the transceiver, the processor configured to determine hybrid automatic repeat request acknowledgement (HARQ-ACK) information bits in response to a PDSCH reception,
wherein:
when a PDCCH reception is in a CORESET from the first CORESETs, the HARQ-ACK information bits are in a first HARQ-ACK codebook,
when the PDCCH reception is in a CORESET from the second CORESETs, the HARQ-ACK information bits are in a second HARQ-ACK codebook, and
the transceiver is further configured to transmit a first physical uplink control channel (PUCCH) with the first HARQ-ACK codebook and a second PUCCH with the second HARQ-ACK codebook.

2. The UE of claim 1, wherein:
the transceiver is further configured to receive a first reference signal (RS) and a second RS;
the processor is further configured to determine:
a first pathloss using the first RS and a second pathloss using the second RS, and
a first power based on the first pathloss and a second power based on the second pathloss; and
the transceiver is further configured to transmit the first PUCCH with the first power and the second PUCCH with the second power.

3. The UE of claim 2, wherein:
the processor is further configured to determine a first spatial setting from the first RS and a second spatial setting from the second RS; and
the transceiver is further configured to transmit the first PUCCH using the first spatial setting and the second PUCCH using the second spatial setting.

39

4. The UE of claim 2, wherein:
the transceiver is further configured to receive a configuration for a first spatial setting and for a second spatial setting; and
the transceiver is further configured to transmit the first PUCCH using the first spatial setting and the second PUCCH using the second spatial setting.

5. The UE of claim 1, wherein:
the PDCCH reception is in the CORESET from the first CORESETs and provides a first DCI format,
the first DCI format includes a first set of fields or a second set of fields,
the first set of fields includes a field indicating a spatial setting from a set of spatial settings,
the second set of fields does not include the field indicating the spatial setting,
the transceiver is further configured to receive the set of spatial settings,
the processor is further configured to determine the spatial setting for a transmission of the first PUCCH according to:
  the field when the first DCI format includes the first set of fields, or
  a first spatial setting from the set of spatial settings when the first DCI format includes the second set of fields, and
the transceiver is further configured to transmit the first PUCCH using the determined spatial setting.

6. The UE of claim 1, wherein:
the processor is further configured to determine a first spatial setting for transmission of the first PUCCH and a second spatial setting for transmission of the second PUCCH; and
the transceiver is further configured to transmit the first PUCCH using the first spatial setting and the second PUCCH using the second spatial setting when the first PUCCH transmission and the second PUCCH transmission are separated by a predetermined time interval.

7. The UE of claim 1, wherein:
the PDCCH reception is in the CORESET from the first CORESETs and provides a first DCI format,
the first DCI format includes a PUCCH resource indicator (PRI) field,
a value of the PRI field indicates a PUCCH resource that includes a set of parameters,
the set of parameters includes a spatial setting, and
the transceiver is further configured to transmit the first PUCCH according to first set of parameters.

8. The UE of claim 1, wherein:
the PDCCH reception is in the CORESET from the first CORESETs and provides a first DCI format,
the first DCI format includes a counter downlink assignment index (DAI) field,
a value of the counter DAI field indicates a number of DCI formats,
the number of DCI formats is provided by PDCCH receptions in CORESETs from the first CORESETs,
HARQ-ACK information bits corresponding to the number of DCI formats are in the first HARQ-ACK codebook, and
HARQ-ACK information bits corresponding to the first DCI format are placed last in the first HARQ-ACK codebook.

9. A base station comprising:
a processor; and
a transceiver operably coupled to the processor, the transceiver configured to:

40 transmit a configuration for first control resource sets (CORESETs) and second CORESETs;
  transmit physical downlink control channels (PDCCHs) in the first or second CORESETs, wherein the PDCCHs provide respective downlink control information (DCI) formats scheduling respective receptions of physical downlink shared channels (PDSCHs);
  transmit the PDSCHs corresponding to the PDCCHs; and
  receive a first physical uplink control channel (PUCCH) with a first hybrid automatic repeat request acknowledgement (HARQ-ACK) codebook and a second PUCCH with a second HARQ-ACK codebook,
wherein:
  the first and second HARQ-ACK codebooks provide HARQ-ACK information bits for the PDSCH transmissions,
  when a PDCCH transmission is in a CORESET from the first CORESETs, HARQ-ACK information bits for a corresponding PDSCH transmission are in the first HARQ-ACK codebook, and
  when the PDCCH transmission is in a CORESET from the second CORESETs, HARQ-ACK information bits for the corresponding PDSCH transmission are in the second HARQ-ACK codebook.

10. The base station of claim 9, wherein the transceiver is further configured to:
transmit a configuration for a first spatial setting and for a second spatial setting; and
receive the first PUCCH using the first spatial setting and the second PUCCH using the second spatial setting.

11. The base station of claim 9, wherein:
the PDCCH transmission is in the CORESET from the first CORESETs and provides a first DCI format,
the first DCI format includes a first set of fields or a second set of fields,
the first set of fields includes a field indicating a spatial setting from a set of spatial settings,
the second set of fields does not include the field indicating the spatial setting,
the processor is configured to determine a spatial setting for a reception of the first PUCCH according to:
  the field when the first DCI format includes the first set of fields, or
  a first spatial setting from the set of spatial settings when the first DCI format includes the second set of fields, and
the transceiver is further configured to:
  transmit the set of spatial settings; and
  receive the first PUCCH using the determined spatial setting.

12. The base station of claim 9, wherein:
the PDCCH transmission is in the CORESET from the first CORESETs and provides a first DCI format,
the first DCI format includes a PUCCH resource indicator (PRI) field,
a value of the PRI field indicates a PUCCH resource that includes a set of parameters,
the set of parameters includes a spatial setting, and
the transceiver is further configured to receive the first PUCCH according to the set of parameters.

13. The base station of claim 9, wherein:
the PDCCH transmission is in the CORESET from the first CORESETs and provides a first DCI format, the first DCI format includes a counter downlink assignment index (DAI) field, a value of the counter DAI field indicates a number of DCI formats, the number of DCI formats is provided by PDCCH transmissions in CORESETs from the first CORESETs, HARQ-ACK information bits corresponding to the number of DCI formats are in the first HARQ-ACK codebook, and HARQ-ACK information bits corresponding to the first DCI format are placed last in the first HARQ-ACK codebook.

14. A method of a user equipment (UE) for transmitting hybrid automatic repeat request acknowledgement (HARQ-ACK) information, the method comprising:

receiving:
- a configuration for first control resource sets (CORESETs) and second CORESETs,
- physical downlink control channels (PDCCHs) in the first or second CORESETs, wherein the PDCCHs provide respective downlink control information (DCI) formats scheduling respective receptions of physical downlink shared channels (PDSCHs), and the PDSCHs corresponding to the PDCCHs;

determining HARQ-ACK information bits in response to a PDSCH reception, wherein:
- when a PDCCH reception is in a CORESET from the first CORESETs, the HARQ-ACK information bits are in a first HARQ-ACK codebook, and
- when the PDCCH reception is in a CORESET from the second CORESETs, the HARQ-ACK information bits are in a second HARQ-ACK codebook; and transmitting a first physical uplink control channel (PUCCH) with the first HARQ-ACK codebook and a second PUCCH with the second HARQ-ACK codebook.

15. The method of claim 14, further comprising:

receiving a first reference signal (RS) and a second RS; and determining:
- a first pathloss using the first RS and a second pathloss using the second RS, and
- a first power based on the first pathloss and a second power based on the second pathloss, wherein the transmitting further comprises transmitting the first PUCCH with the first power and the second PUCCH with the second power.

16. The method of claim 15, further comprising:

determining a first spatial setting from the first RS and a second spatial setting from the second RS, wherein the transmitting further comprises transmitting the first PUCCH using the first spatial setting and the second PUCCH using the second spatial setting.

17. The method of claim 15, further comprising:

receiving a configuration for a first spatial setting and for a second spatial setting, wherein the transmitting further comprises transmitting the first PUCCH using the first spatial setting and the second PUCCH using the second spatial setting.

18. The method of claim 14, further comprising:

receiving a set of spatial settings; and determining a first spatial setting for a transmission of the first PUCCH according to:
- a field in a first set of fields when a first DCI format includes the first set of fields, and
- a first spatial setting from the set of spatial settings when the first DCI format includes a second set of fields; and wherein:
- transmitting the PUCCH further comprises transmitting the first PUCCH using the first spatial setting,
- the PDCCH reception is in the CORESET from the first CORESETs and provides the first DCI format,
- the first DCI format includes the first set of fields or the second set of fields,
- the first set of fields includes the field indicating a spatial setting from a set of spatial settings for PUCCH transmissions, and
- the second set of fields does not include the field indicating the spatial setting.

19. The method of claim 14, wherein:

transmitting the PUCCH further comprises transmitting the first PUCCH according to a set of parameters, the PDCCH reception is in the CORESET from the first CORESETs and provides a first DCI format, the first DCI format includes a PUCCH resource indicator (PRI) field, a value of the PRI field indicates a PUCCH resource that includes the set of parameters, and the set of parameters includes a spatial setting.

20. The method of claim 14, wherein:

the PDCCH reception is in the CORESET from the first CORESETs and provides a first DCI format, the first DCI format includes a counter downlink assignment index (DAI) field, a value of the counter DAI field indicates a number of DCI formats, the number of DCI formats is provided by PDCCH receptions in CORESETs from the first CORESETs, HARQ-ACK information bits corresponding to the number of DCI formats are in the first HARQ-ACK codebook, and HARQ-ACK information bits corresponding to the first DCI format are placed last in the first HARQ-ACK codebook.

* * * * *